US012712216B2

(12) United States Patent
Webster et al.

(10) Patent No.: US 12,712,216 B2
(45) Date of Patent: Aug. 18, 2026

(54) COOLING TECHNIQUES FOR BATTERY PACKAGES

(71) Applicant: BAE Systems Controls Inc., Endicott, NY (US)

(72) Inventors: Benjamin T. Webster, Lisle, NY (US); Peter J. Arnold, Endicott, NY (US); Joshua P. Stewart, Vestal, NY (US); Jay R. Johnson, Vestal, NY (US); Matthew S. Boecke, Endicott, NY (US)

(73) Assignee: BAE Systems Controls Inc., Endicott, NY (US)

(*) Notice: Subject to any disclaimer, the term of this patent is extended or adjusted under 35 U.S.C. 154(b) by 823 days.

(21) Appl. No.: 18/121,229

(22) Filed: Mar. 14, 2023

(65) Prior Publication Data

US 2024/0313287 A1 Sep. 19, 2024

(51) Int. Cl.

*H01M 10/613* (2014.01)
*H01M 10/625* (2014.01)
*H01M 10/6554* (2014.01)

(52) U.S. Cl.

CPC ....... *H01M 10/613* (2015.04); *H01M 10/625* (2015.04); *H01M 10/6554* (2015.04)

(58) Field of Classification Search

CPC ............. H01M 10/613; H01M 10/625; H01M 10/6554; H01M 2220/20; H01M 10/653; H01M 10/6556; Y02E 60/10

See application file for complete search history.

(56) References Cited

U.S. PATENT DOCUMENTS

| | | | | |
|---|---|---|---|---|
| 8,906,541 | B2 | 12/2014 | Faass et al. | |
| 11,923,556 | B2 * | 3/2024 | Chen | H01M 50/691 |
| 2009/0023056 | A1 | 1/2009 | Adams et al. | |
| 2009/0120620 | A1 * | 5/2009 | Abe | H01M 10/643 165/104.31 |
| 2015/0037647 | A1 * | 2/2015 | Nguyen | H01M 10/6555 429/120 |

(Continued)

FOREIGN PATENT DOCUMENTS

| | | | | |
|---|---|---|---|---|
| CN | 102610871 A | * | 7/2012 | H01M 10/6557 |
| CN | 104733669 A | * | 6/2015 | H01M 10/613 |

(Continued)

OTHER PUBLICATIONS

International Search Report, PCT/US24/19372, mailed Jun. 28, 2024, 13 pages.

*Primary Examiner* — Kaity V Chandler
(74) *Attorney, Agent, or Firm* — Scott J. Asmus

(57) ABSTRACT

A method includes forming a cold plate including conductive material and having a plurality of openings, and coating the cold plate with dielectric coating. The method further includes placing the cold plate proximal to a metal plate including one or more metals, and exposing the cold plate to moisture and/or water. In an example, a minimum lateral distance between the cold plate and the metal plate is at most 0.5 inch. The method further includes, while the cold plate is exposed to the moisture and/or the water, applying a voltage across the cold plate and the metal plate, and measuring a resultant leakage current through the cold plate. A thickness of the dielectric coating on an edge of an opening of the plurality of openings is at least 0.003 inch.

10 Claims, 10 Drawing Sheets

(56) References Cited

U.S. PATENT DOCUMENTS

| | | | | |
|---|---|---|---|---|
| 2017/0005382 | A1* | 1/2017 | Kim | H01M 10/0431 429/120 |
| 2019/0319249 | A1 | 10/2019 | Barton et al. | |
| 2021/0367288 | A1* | 11/2021 | Tong | H01M 10/6555 |
| 2022/0285753 | A1 | 9/2022 | Rainville et al. | |
| 2023/0064245 | A1* | 3/2023 | Gage | H01M 10/6554 |
| 2023/0066953 | A1* | 3/2023 | Gage | H01M 10/6556 |
| 2023/0126900 | A1* | 4/2023 | Vogel | H01M 10/613 429/120 |
| 2024/0006684 | A1* | 1/2024 | Maguire | H01M 10/6568 |

FOREIGN PATENT DOCUMENTS

| | | | | | |
|---|---|---|---|---|---|
| CN | 205583097 | U | * | 9/2016 | Y02E 60/10 |
| CN | 207233801 | U | * | 4/2018 | Y02E 60/10 |
| CN | 111201663 | A | * | 5/2020 | H01M 10/625 |
| CN | 210805858 | U | * | 6/2020 | Y02E 60/10 |
| CN | 211858814 | U | * | 11/2020 | Y02E 60/10 |
| CN | 212648370 | U | * | 3/2021 | Y02E 60/10 |
| CN | 112787011 | A | * | 5/2021 | H01M 10/6556 |
| CN | 113161644 | A | * | 7/2021 | H01M 10/6554 |
| CN | 113594601 | A | * | 11/2021 | H01M 50/249 |
| CN | 113851767 | A | * | 12/2021 | H01M 10/625 |
| CN | 114094226 | A | * | 2/2022 | H01M 10/613 |
| CN | 115084726 | A | * | 9/2022 | H01M 10/6571 |
| CN | 217740642 | U | * | 11/2022 | Y02E 60/10 |
| CN | 218414754 | U | * | 1/2023 | Y02E 60/10 |
| DE | 10 2009 035 461 | A1 | | 2/2011 | |
| WO | 2021/173991 | A1 | | 9/2021 | |

* cited by examiner 100
104a
126
124
124
126
104b
122
108a1
L1
118a
132b
+
130
130
122
132a
116a
130
+
L2
130
108b1
104a
122
104b
126
124
124
132c
126
z
x

COOLING TECHNIQUES FOR BATTERY PACKAGES

TECHNICAL FIELD

The present disclosure relates generally to batteries, and more particularly to cooling of battery assemblies.

BACKGROUND

A battery is a popular source of electric power, e.g., providing direct current (DC) to a load. A battery has a positive terminal or cathode, and a negative terminal or anode. Multiple batteries can be coupled in series and/or parallel, to form a high voltage and/or high power DC power source.

Rechargeable batteries can be charged and discharged, and such charge and discharge cycles can occur multiple times over a life of a battery. For example, once the battery is discharged while in use, the battery can be recharged using an applied electric current, during which an original composition of the battery electrodes may be fully or at least partially restored by reverse current. Examples of such rechargeable batteries include lead-acid batteries and lithium-ion batteries. Batteries can be used for any number of applications, such as consumer electronic devices, wearable devices, computers, electrical and non-electric vehicles, and/or many other devices or systems that use DC power. There remain several non-trivial issues with respect to designing and operating battery packs.

Figure 1A:
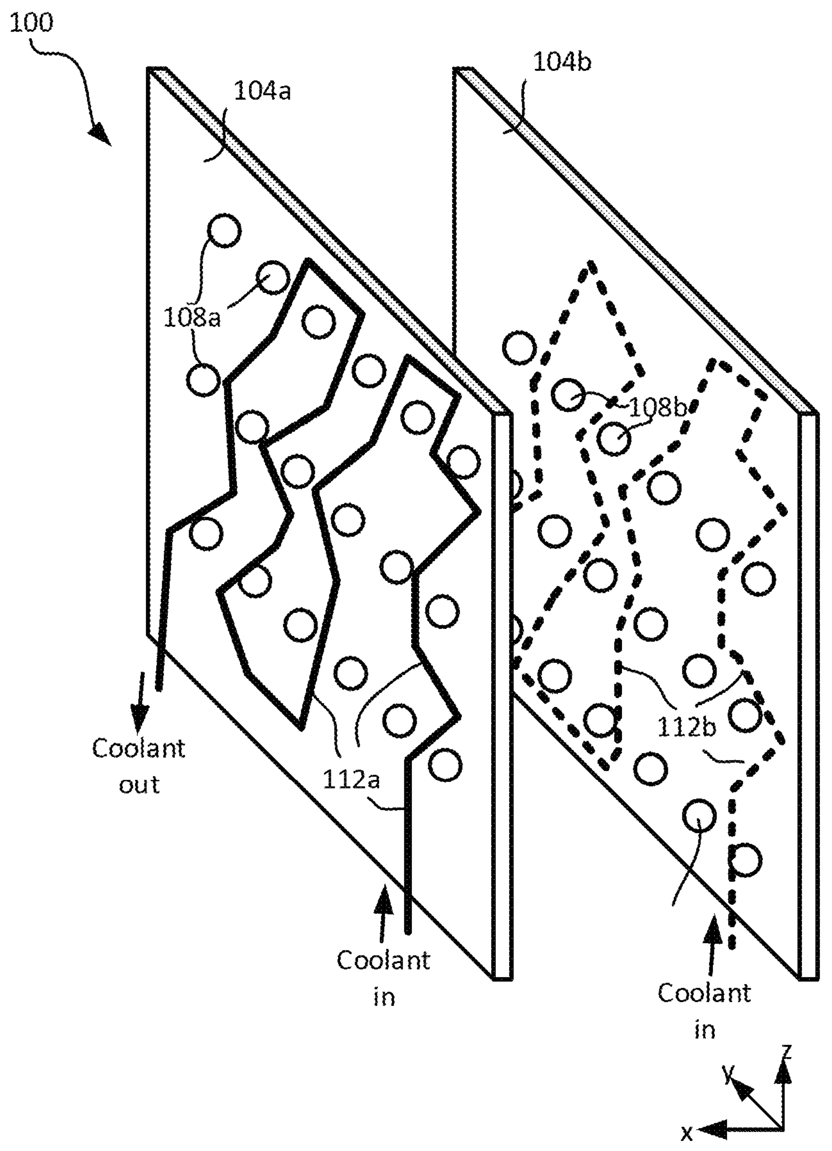
FIGS. 1A, 1B, 1C, and 1D illustrate various views of an example battery assembly, in accordance with an embodiment of the present disclosure.

The figures depict various embodiments of the present disclosure for purposes of illustration only and are not necessarily drawn to scale. Numerous variations, configurations, and other embodiments will be apparent from the following detailed discussion.

DETAILED DESCRIPTION

A battery assembly is described herein that includes a cooling arrangement. In an example, the cooling arrangement includes one or more cold plates including conductive material coated with one or more layers of dielectric material, where each cold plate has a plurality of openings to allow venting of outgases from corresponding one or more battery cells, e.g., during a faulty operation of a battery cell. Furthermore, each of the one or more cold plates may have sufficiently thick dielectric coating on sidewalls and edges of the openings, to prevent or reduce chances of electrical shorting between edges of individual openings of the cold plate and conductive lines coupled to battery terminals. Such coating may, for example, help reduce electrical shorting due to condensate accumulation in the cold plate(s) (where the condensate water tends to accumulate on side walls of openings of the cold plate(s).

In one embodiment, a battery assembly comprises a first cold plate comprising conductive material and coated with dielectric coating, where the first cold plate includes a first array of openings therewithin. A first battery has a first positive terminal that is adjacent to and substantially aligned with a first opening of the first array of openings. A conductive line is coupled to the first positive terminal of the first battery. In an example, a distance between the conductive line and an edge of the first opening is at most 0.4 inch. A second cold plate is substantially parallel to the first cold plate, where the second cold plate comprises conductive material and coated with dielectric coating. The second cold plate includes a second array of openings therewithin. A second battery has a second positive terminal that is adjacent to and substantially aligned with a second opening of the second array of openings.

In an example, the first battery is configured to, during a faulty operation of the first battery, vent outgases from or near the positive terminal of the first battery, such that the outgases are vented out of the battery assembly through the first opening of the array of openings of the first cold plate. Similarly, the second battery is configured to, during a faulty operation of the second battery, vent outgases from or near the positive terminal of the second battery, such that the outgases are vented out of the battery assembly through the second opening of the array of openings of the second cold plate.

In another example, a method of forming and testing a cold plate of the battery assembly is also disclosed. For example, a cold plate is formed, where the cold plate comprises conductive material and has a plurality of openings. The cold plate is coated with dielectric coating. The cold plate is placed proximal to a metal plate comprising one or more metals, and the cold plate and the metal plate are exposed to moisture and/or water. For example, the cold plate and the metal plate are exposed to moisture and/or water by submerging the cold plate and the metal plate in water. In another example, the cold plate and the metal plate are exposed to moisture and/or water by spraying water on the cold plate and/or operating a water humidifier proximate to the cold plate. In an example, a minimum lateral distance between the cold plate and the metal plate is at most 0.5 inch. A voltage is applied across the cold plate and the metal plate, and a resultant leakage current through the cold plate is measured. In response to the leakage current being higher than a threshold value, the cold plate is recoated with the dielectric coating, and retested again for the leakage current, and this process is repeated until the leakage current goes below the threshold value. In an example, a thickness of the dielectric coating on an edge of an opening of the plurality of openings of the cold plate is at least 0.003 inch. Numerous variations and embodiments will be apparent in light of the present disclosure.

General Overview

As indicated above, there remain several non-trivial issues with respect to designing and operating battery packs. For example, battery packs may generate heat during operation, and cooling arrangements may be deployed to cool the battery packs, so as to keep the battery temperature within acceptable limit. Due to relatively low temperature of the cooling arrangement (e.g., compared to an ambient temperature), water may condensate on one or more sections of the cooling arrangement, which may increase chances of electrical shorting in the battery assembly. Moreover, during a faulty operation of a battery cell (such as during a thermal runaway condition or for another reason), gases may be released by a battery cell, referred to herein as “outgassing” of the battery cell. For example, a pressure relief valve or membrane of the battery cell may rapture during such an outgassing event (e.g., due to pressure build up within the battery cell due to faulty operation of the battery cell), thereby releasing such gases.

Accordingly, techniques are described herein to form a battery assembly that includes a cooling arrangement comprising one or more cold plates, where each cold plate has a plurality of openings to allow venting of outgases, e.g., during a faulty operation of a battery cell. Furthermore, to avoid chances of electrical shorting due to condensate accumulation (where the condensate water tends to accumulate on side walls of openings of the cold plates), each cold plate may have sufficient dielectric coating on sidewalls and edges of the openings, to prevent or reduce chances of electrical shorting between edges of individual openings of the cold plate and conductive lines coupled to battery terminals.

In one embodiment, the battery assembly described herein has one or more cold plates, such as two substantially parallel cold plates, e.g., a first cold plate and a second cold plate. Battery cells are arranged laterally between the first and second cold plates. Battery cells are arranged in an alternating manner. In an example, some battery cells have positive terminals facing the first cold plate and negative terminals facing the second cold plate, whereas some other battery cells have positive terminals facing the second cold plate and negative terminals facing the first cold plate. Individual cold plates comprise conductive material (such as metals and/or metal alloys) coated with one or more layers of dielectric material coating.

The positive terminal of each battery cell is adjacent to, and substantially aligned with, a corresponding opening of a corresponding cold plate. For example, a first battery cell has a first positive terminal facing the first cold plate, such that the first positive terminal of the first battery cell is adjacent to and substantially aligned with a corresponding first opening of the first cold plate. Similarly, a second battery cell has a second positive terminal facing the second cold plate, such that the second positive terminal of the second battery cell is adjacent to and substantially aligned with a corresponding second opening of the second cold plate.

In an example, the openings of the first and second cold plates are for venting outgases that may be expelled by a battery cell, e.g., during a faulty operation of the battery cell. For example, a pressure relief valve or membrane may be on or near the cathode or positive terminal of the battery cell, e.g., on or near the surface of the battery cell including the positive terminal. The pressure relief valve or membrane may rupture during such an outgassing event (e.g., due to pressure build up within the battery cell due to faulty operation of the battery cell), thereby releasing such gases.

Because of the venting of such gases from or near the positive terminal of a battery cell, the positive terminal of each battery cell is adjacent to, and substantially aligned with, a corresponding opening, e.g., such that the vented outgas from a battery cell can exit the battery assembly through a corresponding opening of the cold plate. Thus, the openings in the cold plates form a safe exit path for the outgases. Venting of the outgases through a corresponding opening within the cold plate prevents or at least reduces of propagation of the outgases to the battery cell itself or to adjacent battery cells, thereby preventing or at least reducing fire hazards in the battery assembly.

Note that because the outgases may not exit a battery cell from or near a corresponding negative terminal of the battery cell, the negative terminal of the battery cell may not have a corresponding adjacent opening in the cold plates. For example, a negative side ejection may be possible, but may be unlikely, e.g., given the manner in which individual battery cells are manufactured. In some examples, the negative terminals of the battery cells may be adjacent to the openings, e.g., instead of or in addition to the positive terminals of the battery cells being adjacent to the openings.

In one embodiment, the battery cells are held in place by a honeycomb like structure. The structure prevents or reduces movement of individual battery cells, and comprises rigid material, such as aluminum, epoxy resin, and/or another appropriate material, with holes or slots machined therewithin, to allow fitting a battery cell within a corresponding slot.

In one embodiment, the battery assembly comprises a plurality of conductive bus bars or connection lines, e.g., for coupling a corresponding positive or negative terminal of a battery cell to an adjacent battery cell (or to another component of the battery assembly). In one embodiment, the lines comprise conductive material, such as one or more metals and/or alloys thereof.

In one embodiment, the battery assembly comprises fire retardant dielectric material, such as dielectric foam adjacent to a coupling between a battery terminal and a line. The foam acts as fire retardant and thermal barrier, e.g., to prevent or reduce chances of propagation of fire and/or thermal transfer from a battery cell to an adjacent battery cell. Thermal pads (also referred to herein as gap pads) are between the cold plates and the conductive lines. The thermal pads act as thermal interface material between a cold plate and the battery cells. For example, during operation of the battery assembly, the thermal pads transfer heat from the battery cells to the cold plates, e.g., to prevent or reduce chances of the battery cells being overheated. The thermal pads comprise dielectric material having relatively high thermal conductivity. In an example, thermal pads are also used to fill air gaps caused by imperfectly flat (or smooth) surfaces of the conductive lines. As illustrated in FIG. 1D, each thermal pad (e.g., one adjacent to the first cold plate and another adjacent to the second cold plate) has a corresponding array of openings that is substantially aligned with the array of openings of the adjacent cold plate, e.g., to allow venting of the outgases from the positive terminals of the aligned battery cells.

As illustrated in FIG. 1D, a portion of a conductive line and the cold plate is separated by empty space or air, and a minimum distance between a line and an opening of the first cold plate is L1, and a minimum distance between another line and an opening of the second cold plate is L2, see FIG. 1D. Lengths L1 and L2 are at most 1 inch, or at most 0.8 inch, or at most 0.4 inch, or at most 0.2 inch, or at most 0.1 inch, or at most 0.08 inch, or at most 0.06 inch, or at most 0.05 inch, or at most 0.04 inch, in an example.

In an example, the first and second cold plates are relatively cold, e.g., colder than the ambient air within which the battery assembly operates. Accordingly, there may be moisture condensate on walls of the cold plates (e.g., see FIG. 2). For example, drops of water can accumulate on the cold plates. The water drops can be on side surfaces of the cold plates, e.g., adhered to the side surfaces due to surface tension. Furthermore, water tends to drip and accumulate or pool on bottom sidewalls of the openings of the cold plates (e.g., see FIG. 2). For example, water from the side surfaces of the cold plates drips and comes downwards (e.g., due to gravity), and tends to accumulate on the bottom sidewalls of individual openings.

Figure 3:
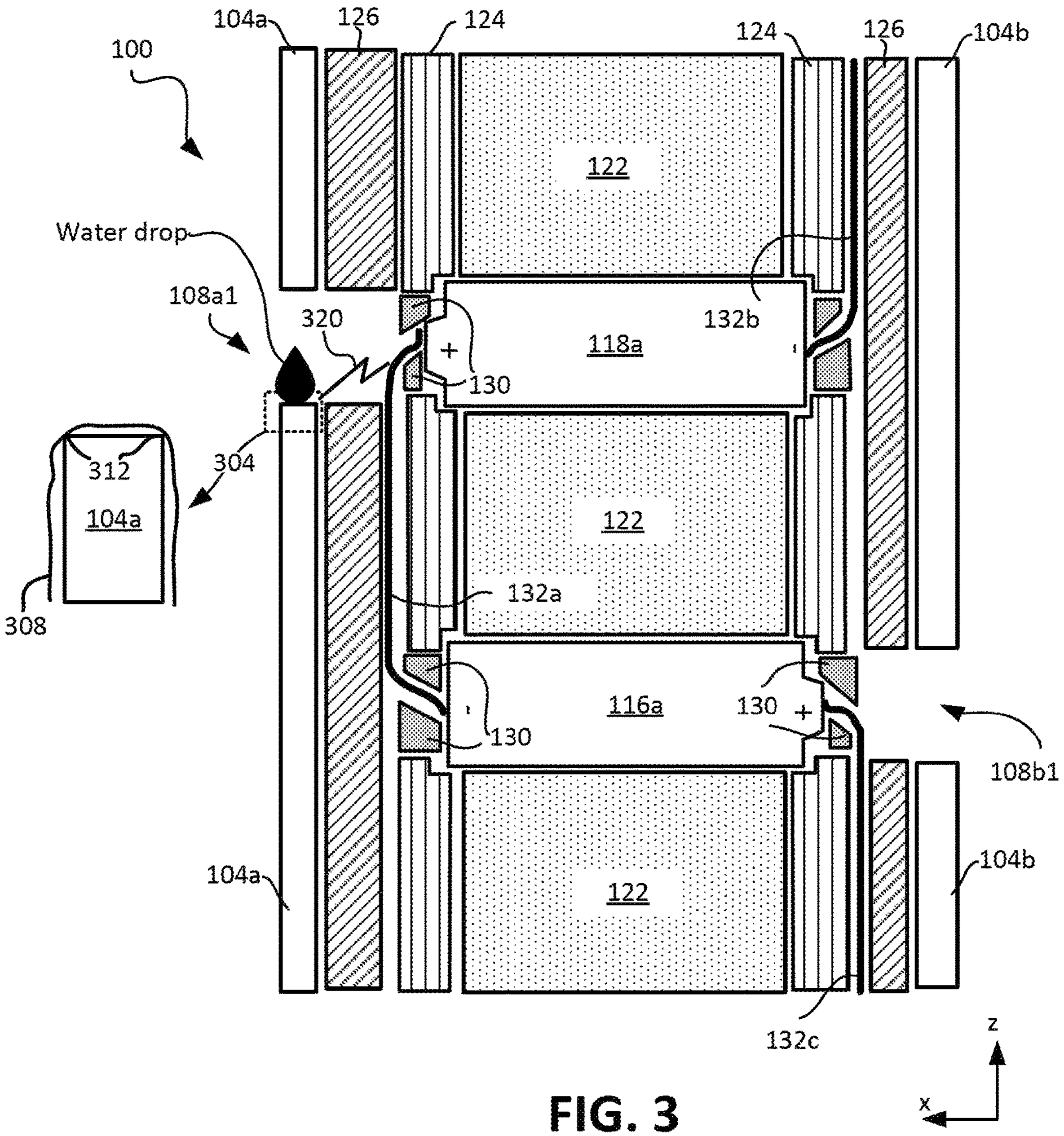
FIG. 3 illustrates dielectric material coating on the cold plates of the battery assembly of FIGS. 1A-D and 2, and further schematically illustrates example locations susceptible to electrical shorting between conductive line(s) and the cold plate(s) of the battery assembly, in accordance with an embodiment of the present disclosure.
Figure 4:
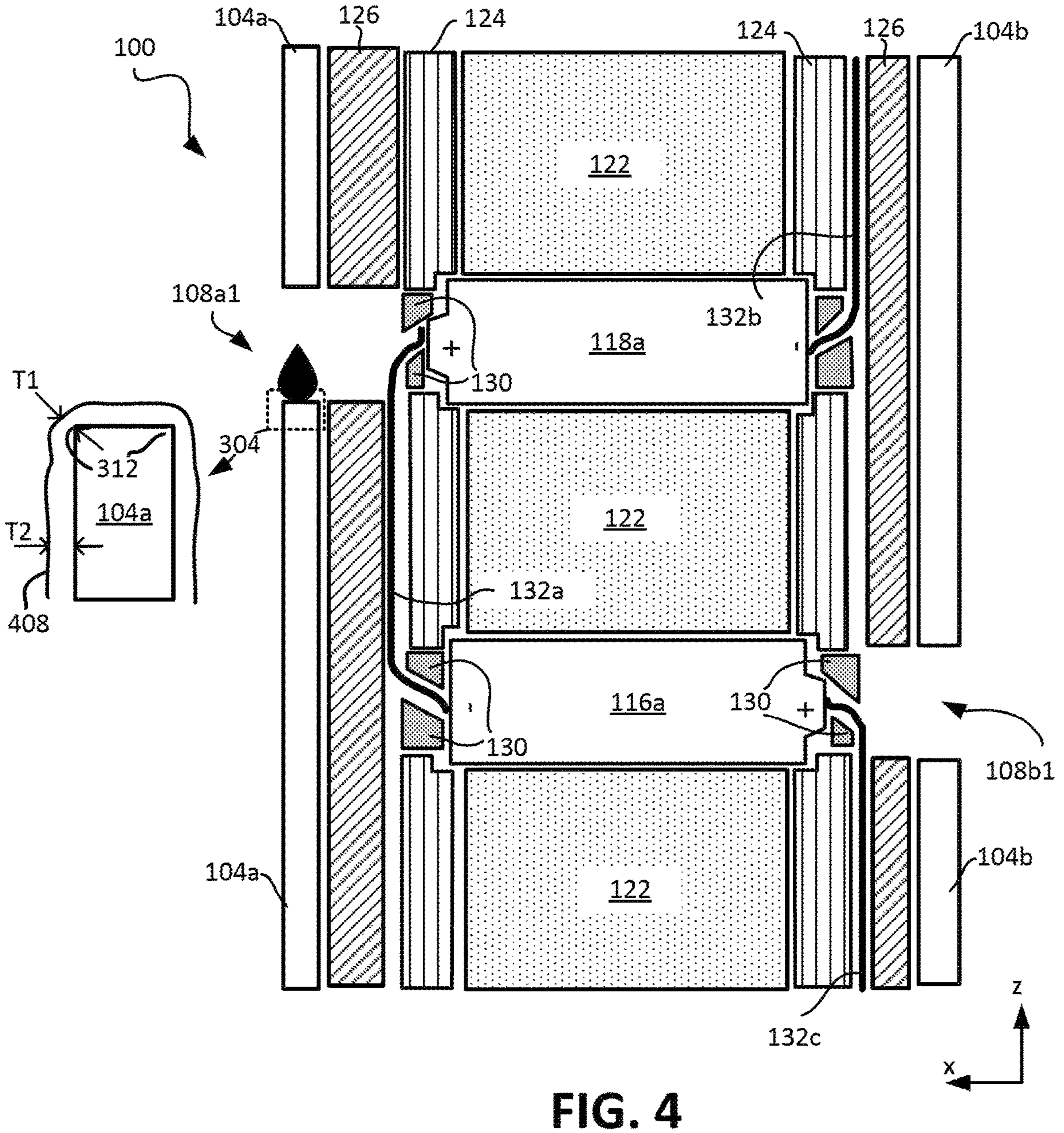
FIG. 4 illustrates another dielectric material coating on the cold plate(s) of the battery assembly of FIGS. 1A-D and 2, where the coating has at least a threshold thickness T1 on edges of an opening of a cold plate, in accordance with an embodiment of the present disclosure.

As described above, each of the first and second cold plates have one or more layers of dielectric material coating. In an example, the dielectric coating is thicker on non-edge surfaces of a cold plate and thinner on edges of the openings of the cold plate. For example, coating on non-edge surfaces can have a thickness of 0.005 to 0.01 inch thickness, e.g., have a thickness of at least 0.003 inch, or at least 0.005 inch, or at least 0.008 inch, or at least 0.01 inch, or at least 0.015 inch, or at least 0.02 inch. In contrast, the thickness of the dielectric coating on the edges of the opening may be less than 0.003 inch, or less than 0.002 inch, or less than 0.001 inch, for example. An example difference in thickness of the dielectric coating is illustrated in FIGS. 3 and 4. The thinner dielectric material coating on the edges may be due to deposition techniques used to deposit the coatings on the cold plate. For example, after the coating is deposited on a cold plate, retention of the coating on the edges is relatively low, compared to a retention of the coating on the non-edge surfaces of the cold plate. For example, the coating may not sufficiently bind to the edges, compared to the binding of the coating on the non-edge surfaces of the cold plate.

Furthermore, in an example, the battery assembly may be installed within an aircraft, e.g., within a pressurized section of the aircraft or within a section of the aircraft that is not pressurized. In an example, the air pressure within the aircraft and consequently adjacent to the battery assembly decreases as and when the aircraft gains altitude, which may increase air conductivity (e.g., air is more conductive at lower air pressure). Additionally, or alternatively, due to presence of higher energy particles from the space at higher altitude (which diminishes proximate to the earth's surface), the electrical conductivity at higher altitude is higher than that at the sea level.

In an example, thus, (i) water droplets accumulate on or near edges of the openings of the cold plates, (ii) thickness of the coating at or near the edges of the openings of the cold plates may be relatively less (e.g., less than that on non-edge surfaces of the cold plates), (iii) distance between the line and the edges of the openings of the cold plates (e.g., the length L1 of FIG. 2) may be relatively less, as described above, (iv) the battery assembly may have relatively high voltage of operation at the positive terminal of the battery, and/or (v) air conductivity at higher altitude may be more than that at the sea level, during an operation of the battery assembly (e.g., when the aircraft, in which the battery assembly is installed, is flying high in the air). In an example, one or more of the above factors may contribute to an electrical arcing or shorting between the line and an edge of a cold plate, as schematically illustrated in FIG. 3.

In an example, to prevent or at least reduce chances of such shorting, the dielectric coating may have at least a threshold thickness T1 (see FIG. 4) on edges of individual openings of a cold plate. In an example, the thickness T1 is at least 0.002 inch, or at least 0.003 inch, or at least 0.004 inch, or at least 0.005 inch, or at least 0.006 inch, or at least 0.007 inch, or at least 0.008 inch, or at least 0.01 inch, or at least 0.012 inch, or at least 0.015 inch, for example. Also, an average thickness T2 (see FIG. 4) of the coating on non-edge surfaces of the cold plate is at least 0.005 inch, or at least 0.007 inch, or at least 0.009 inch, or at least 0.01 inch, or at least 0.02 inch, or at least 0.025 inch, or at least 0.03 inch, for example. In an example, due to the increased thickness T1 of the coating at or near edges of the openings and/or due to a judicious choice of the dielectric material used for the coating, chances of electrical shorting between the cold plate and the line may be eliminated, or at least reduced.

In an example, to ensure that the dielectric coating on a cold plate is sufficient to eliminate or reduce chances of the above described electrical shorting, the cold plate may be rigorously tested. For example, one or more layers of dielectric material coating are initially applied on a cold plate. Subsequently, a metal plate is placed proximate to the cold plate (see FIGS. 6A and 6B). A lateral distance D between the metal plate and the cold plate may be at most 1 inch, or at most 0.8 inch, or at most 0.7 inch, or at most 0.5 inch, or at most 0.3 inch, or at most 0.1 inch, or at most 0.05 inch, or at most 0.03 inch, for example, In one example, the distance D is substantially zero ($D \approx 0$), in which case at least a section of the cold plate and at least a section of the metal plate are in contact with each other.

Then the cold plate and the metal plate are exposed to moisture and/or water. In one example, the cold plate is sprayed with water and/or placed in a humid environment (see FIG. 6A). In another example, the cold plate and the metal plate are submerged in water (see FIG. 6B). In both examples, water drops (FIG. 6A) or water (FIG. 6B) are on sidewalls and edges of the openings of the cold plate. This mimics the conditions (e.g., water drops on sidewalls and edges of the openings of the cold plate) described above that is caused by condensates during a regular operation of the cold plate.

Subsequently, a voltage V1 is applied across the cold plate and the metal plate, and leakage current I is measured. If the dielectric material coating is applied satisfactorily (e.g., edges of the openings have sufficiently thick coating of at least T1 thickness), then the coating would prevent substantial current I between the metal plate and the cold plate. However, if the dielectric material coating is not applied satisfactorily (e.g., edges of the openings doesn't have sufficiently thick coating), then the coating may not be able to prevent leakage current between the metal plate and the cold plate. Accordingly, in an example, a high value of the current I (e.g., the current I being above a threshold current value) is an indication of electrical shorting between the metal plate and cold plate, which in turn is an indication of weak coating on the cold plate (e.g., less than sufficient thickness of the coating at edges of the openings).

Note that the test voltage V1 may have higher than an operational voltage Va of the battery assembly, e.g., to account for an altitude at which the battery assembly is rated to operate. For example, the battery assembly may be installed within an aircraft, e.g., within a pressurized section of the aircraft or within a section of the aircraft that is not pressurized. In an example, the air pressure within the aircraft and consequently adjacent to the battery assembly may decrease as and when the aircraft gains altitude, which may increase air conductivity (e.g., air is more conductive at lower air pressure). Additionally, or alternatively, due to presence of higher energy particles from the space at increased altitude (which diminishes proximate to the earth's surface), the electrical conductivity at higher altitude may be higher than that at the sea level. Accordingly, in an example, to compensate for the increased air conductivity at a higher altitude in which the battery assembly is rated to operate, as well as to maintain a safety margin of the testing process, the testing voltage V1 is higher than the operational voltage Va of the battery assembly, as will be described below.

As described above, in an example, a determination is made as to whether the leakage current I is more than a threshold current value. If the leakage current I is more than the threshold current value, then one or more additional layers of the coating is reapplied on the cold plate, and the cold plate is tested again. This process of testing and reapplying the coating continues, until the cold plate passes the test, e.g., the leakage current I becomes less than the threshold current value. For example, the leakage current I being less than the threshold current value implies that the coating at the edges of the openings of the cold plate is sufficient to prevent or at least reduce chances of electrical shorting.

Subsequently, the battery assembly is formed using the cold plate that is coated and tested in accordance with above described processes. In an example, the battery assembly may be installed within an aircraft, while in another example the battery assembly may be installed for other appropriate applications as well.

In accordance with some embodiments of the present disclosure, these various approaches can be used individually or together to operate a cooling arrangement of a battery assembly, while allowing for venting of outgases, and preventing or at least reducing chances of electrical shorting due to condensate accumulation in the cooling arrangement.

As used herein, the term "about" indicates that the value listed may be somewhat altered or otherwise within an acceptable tolerance, as long as the alteration does not result in nonconformance of the process or device. For example, for some elements the term "about" can refer to a variation of ±0.1%, for other elements, the term "about" can refer to a variation of ±1% or ±10%, or any point therein. As also used herein, terms defined in the singular are intended to include those terms defined in the plural and vice versa.

Reference herein to any numerical range expressly includes each numerical value (including fractional numbers and whole numbers) encompassed by that range. To illustrate, reference herein to a range of "at least 50" or "at least about 50" includes whole numbers of 50, 51, 52, 53, 54, 55, 56, 57, 58, 59, 60, etc., and fractional numbers 50.1, 50.2 50.3, 50.4, 50.5, 50.6, 50.7, 50.8, 50.9, etc. In a further illustration, reference herein to a range of "less than 50" or "less than about 50" includes whole numbers 49, 48, 47, 46, 45, 44, 43, 42, 41, 40, etc., and fractional numbers 49.9, 49.8, 49.7, 49.6, 49.5, 49.4, 49.3, 49.2, 49.1, 49.0, etc.

As used herein, the term "substantially", or "substantial", is equally applicable when used in a negative connotation to refer to the complete or near complete lack of an action, characteristic, property, state, structure, item, or result. For example, a surface that is "substantially" flat would either completely flat, or so nearly flat that the effect would be the same as if it were completely flat.

Architecture

FIGS. 1A, 1B, 1C, and 1D illustrate various views of an example battery assembly 100, in accordance with an embodiment of the present disclosure.

Figure 1B:
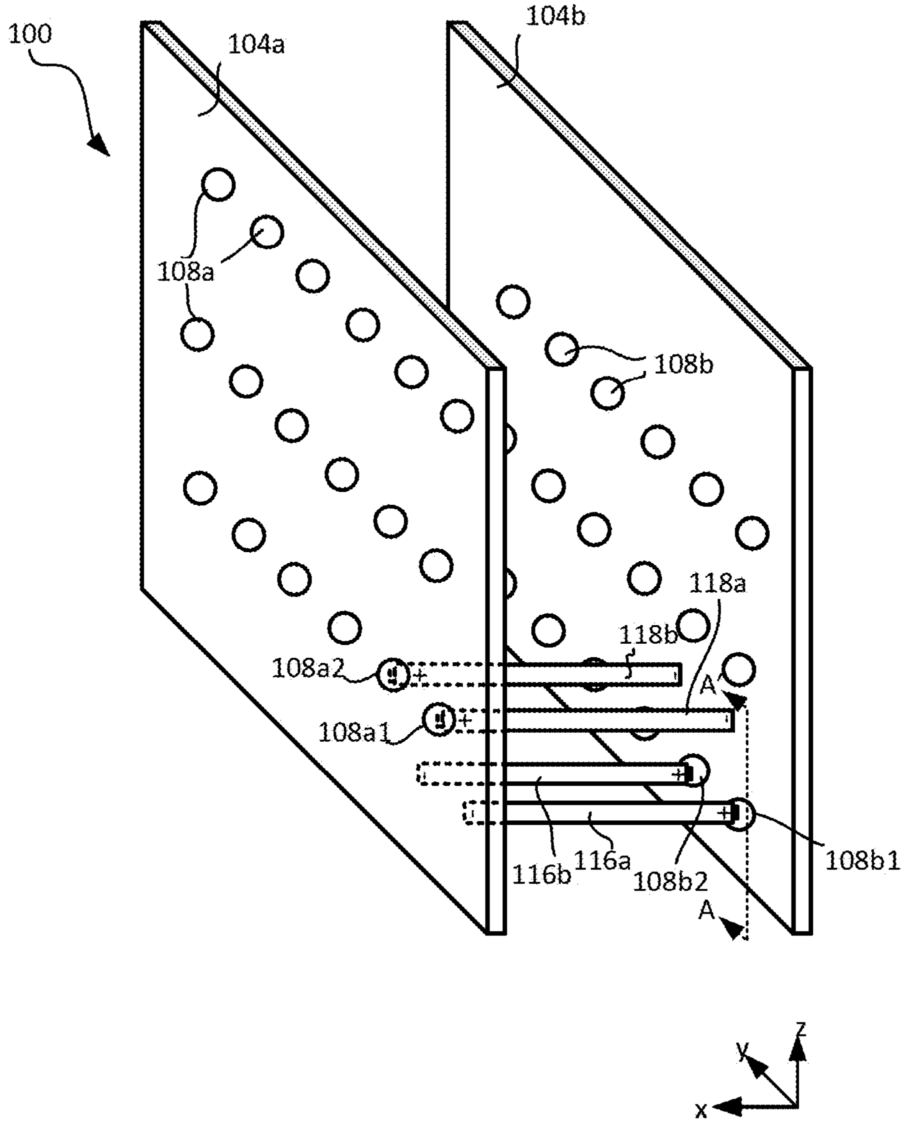
Figure 1C:
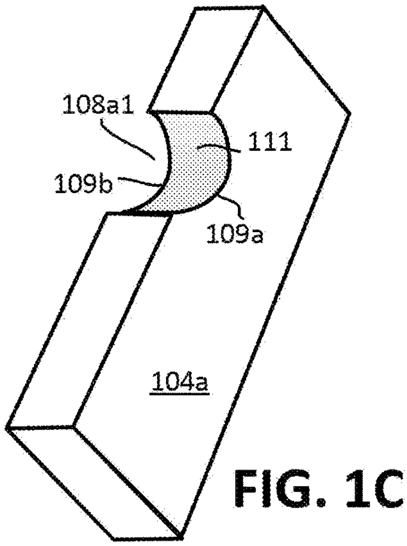
Figure 1D:
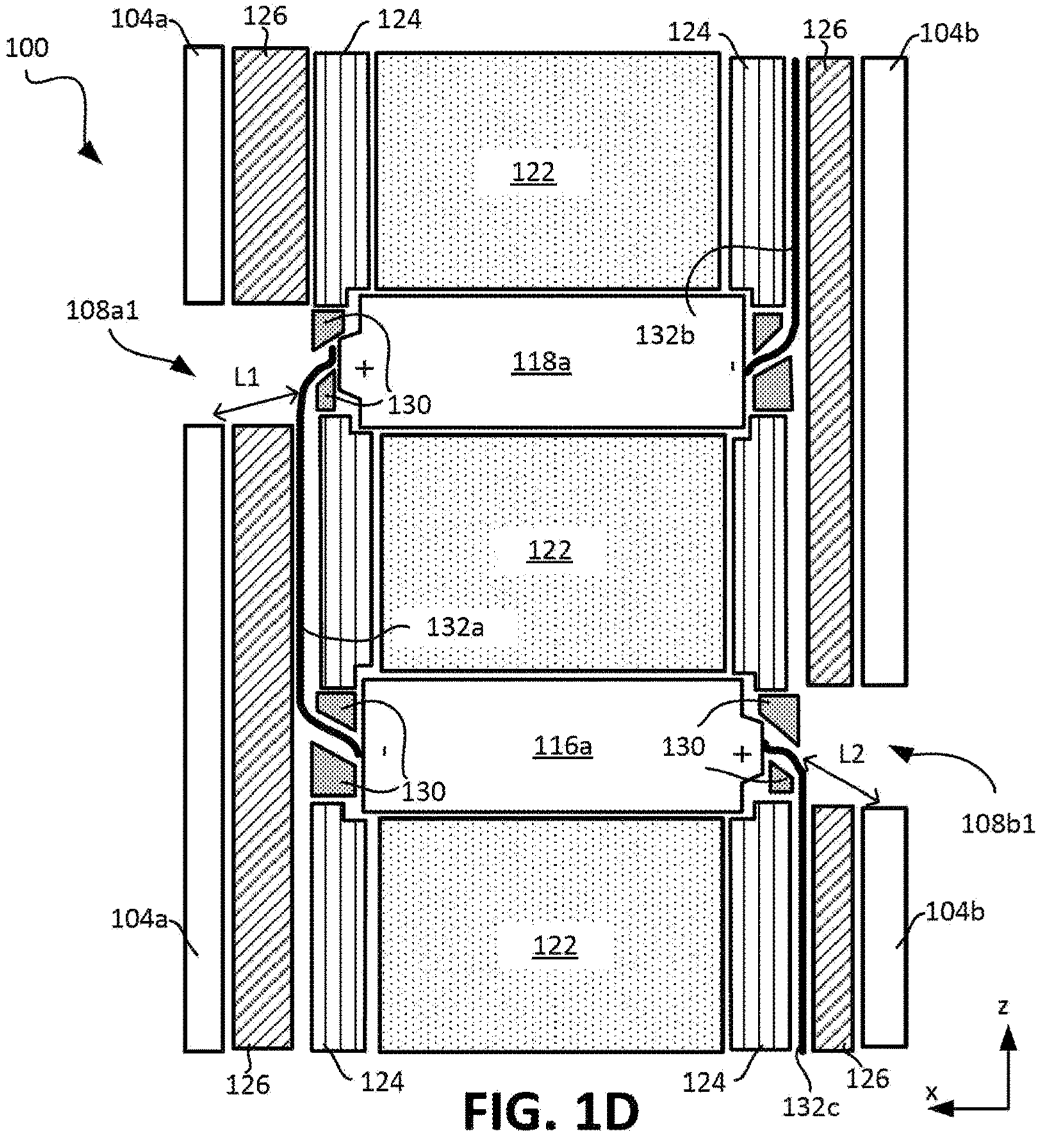

FIG. 1A illustrates a perspective view of the battery assembly 100 (also referred to simply as assembly 100), and illustrates a cooling arrangement of the battery assembly 100 comprising cold plates 104*a*, 104*b*, and coolant tubes 112*a* and 112*b* on the cold plates 104*a* and 104*b*, respectively, and doesn't illustrate other components of the assembly 100. FIG. 1B illustrates another perspective view of the battery assembly 100, and illustrates the cold plates 104*a*, 104*b*, and example battery cells 116*a*, 116*b*, 118*a*, 118*b*, and doesn't illustrate other components of the assembly 100. FIG. 1C illustrates a section of a cold plate 104*a*. FIG. 1D illustrates a cross-sectional view of the battery assembly 100, e.g., along line A-A' of FIG. 1B.

Referring to FIG. 1A, the assembly 100 comprises two cold plates 104*a*, 104*b*, which are substantially parallel to each other. In an example, the cold plates 104*a*, 104*b* comprise thermally conductive material, such as one or more metals and/or alloys thereof, which are coated with one or more layers of dielectric coating material. A cold plate 104 provides cooling of the battery assembly 100, e.g., by transferring heat from the assembly 100 to coolant that flows through the coolant tubes (also referred to simply as tubes) 112*a* and 112*b* and/or to the ambient. One or more thermally conductive metals may be used to form the cold plates 104*a*, 104*b*, such as copper and/or aluminum.

Each cold plate 104 is associated with a corresponding coolant tube 112 that is in contact with, or in close proximity with the cold plate. For example, a coolant tube 112 meanders around the corresponding cold plate 104, e.g., to cover a large area of the cold plate. Example layouts of the coolant tubes 112*a*, 112*b* are illustrated in FIG. 1A, although the coolant tubes 112*a*, 112*b* may have any other appropriate layout configurations. The coolant tube 112*b* of the cold plate 104*b* is illustrated using dotted line in FIG. 1A, as the coolant tube 112*b* would be installed on or proximate to the surface of the cold plate that is not visible in FIG. 1A-hence, the coolant tube 112*b* would not be visible in FIG. 1A. In an example, the coolants tubes 112*a*, 112*b* may be machined or brazed within the corresponding cold plates 104*a*, 104*b*, respectively, such that a coolant tube is sealed by surfaces of the corresponding cold plate.

The tube 112*a* and the tube 112*b* of the cold plates 104*a*, 104*b*, respectively, are schematically illustrated using thick lines. Each of the tubes 112*a*, 112*b* receives relatively cold coolant (e.g., "coolant in" arrow in FIG. 1A), and the cold coolant flows from one end of the tube to the other end. The cold plates 104*a*, 104*b* transfer heat generated from the batteries 116, 118 to the coolant within the tubes 112*a*, 112*b*, respectively, which increases the temperature of the coolant. Relatively hot coolant leaves the tubes 112*a*, 112*b*, and is cooled by an external cooling arrangement, and the cooled coolant is again recirculated within the tubes 112*a*, 112*b*.

As illustrated in FIGS. 1A and 1B, the cold plate 104*a* has an array of openings 108*a*, and the cold plate 104*b* has an array of openings 108*b*. In each cold plate 104, the corresponding openings 108 are arranged in rows and column. In an example, the openings 108*a* of the cold plate 104*a* are offset (e.g., not aligned) with the openings 108*b* of the cold plate 104*b*. For example, if the cold plate 104*a* is arranged on top of the cold plate 104*a* in alignment (e.g., such that the boundary of the cold plate 104*a* is substantially aligned with the boundary of the cold plate 104), then the openings 108*a* and 108*b* will not be aligned, e.g., will be offset with respect to each other. FIG. 1D also illustrates an opening 108*a*1 of the cold plate 104*a* and an opening 108*b*1 of the cold plate 104*a* being offset with respect to each other.

Thus, for example, an imaginary line passing through an opening 108*a*1 and extending towards the cold plate 104*b* (where the imaginary line is substantially orthogonal to one or both the cold plates 104*a*, 104*b*) will not meet or pass through an opening in the cold plate 104*b*. Similarly, for example, an imaginary line passing through an opening 108*b*1 and extending towards the cold plate 104*a* (where the imaginary line is substantially orthogonal to one or both the cold plates 104*a*, 104*b*) will not meet or pass through an opening in the cold plate 104*a*. Note that in FIGS. 1A and 1B, sidewalls of the openings are not illustrated, for purposes of illustrative clarity (see FIG. 1D for sidewalls of a portion of an opening).

In one embodiment, a plurality of battery cells 116, 118 are arranged laterally between the cold plates 104*a*, 104*b*. Some such example battery cells 116*a*, 116*b*, 118*a*, 118*b* are illustrated in FIG. 1B.

In an example, each battery cell 116, 118 is substantially orthogonal to one or both the cold plates 104*a*, 104*b* (note that in an example, the cold plates 104*a*, 104*b* are parallel to each other). For example, each battery cell 116, 118 extends from near one cold plate to near the opposing cold plate.

Each battery cell 116, 118 has a cathode or positive terminal, and an anode or negative terminal. The battery cells 116 (e.g., battery cells 116*a*, 116*b*) have corresponding positive terminals facing the cold plate 104*b*, and the battery cells 118 (e.g., battery cells 118*a*, 118*b*) have corresponding positive terminals facing the cold plate 104*a*, as illustrated in FIG. 1B.

For example, a cathode or positive terminal of each battery cell is adjacent to a corresponding opening of either the cold plate 104*a* or the cold plate 104*b*. For example, the battery cell 116*a* has a positive terminal that is adjacent to, and substantially aligned with, a corresponding opening 108*b*1 of the cold plate 104*b*; and the battery cell 116*b* has a positive terminal that is adjacent to, and substantially aligned with, a corresponding opening 108*b*2 of the cold plate 104*b*, see FIG. 1B. Thus, the positive terminals of the battery cells 116*a* and 116*b* face towards the cold plate 104*b*, and are substantially aligned with respective openings of the cold plate 104*b*.

On the other hand, for example, the battery cell 118*a* has a positive terminal that is adjacent to, and substantially aligned with, a corresponding opening 108*a*1 of the cold plate 104*a*; and the battery cell 118*b* has a positive terminal that is adjacent to, and substantially aligned with, a corresponding opening 108*a*2 of the cold plate 104*a*. Thus, the positive terminals of the battery cells 118*a* and 118*b* face towards the cold plate 104*a*, and are substantially aligned with respective openings of the cold plate 104*a*.

There are numerous other battery cells in the assembly 100 that are not illustrated in FIG. 1B for purposes of illustrative clarity. For example, there is one battery cell for each corresponding opening. Thus, each opening 108*b* of the cold plate 104*b* has a corresponding positive terminal of a corresponding battery cell 116 adjacent to the corresponding opening. Similarly, each opening 108*a* of the cold plate 104*a* has a corresponding positive terminal of a corresponding battery cell 11*b* adjacent to the corresponding opening.

In an example, the openings 108*a*, 108*b* are for venting outgases that may be expelled by a battery cell, e.g., during a faulty operation of the battery cell. For example, during a faulty operation of a battery cell (such as during a thermal runaway condition or for another reason), gases may be released by the battery cell, referred to herein as "outgassing" of the battery cell. For example, a pressure relief valve or membrane may be on or near the cathode or positive terminal of the battery cell, e.g., on or near the surface of the battery cell including the positive terminal. The pressure relief valve or membrane may rupture during such an outgassing event (e.g., due to pressure build up within the battery cell due to faulty operation of the battery cell), thereby releasing such gases.

Because of the venting of such gases from or near the positive terminal of the battery cell, the positive terminal of each battery cell is adjacent to, and substantially aligned with, a corresponding opening, e.g., such that the vented outgas can exit the assembly 100 through the opening. Thus, the opening forms a safe exit path for the outgases. Venting of the outgases through a corresponding opening prevents or at least reduces propagation of the outgases to the battery cell itself or to adjacent battery cells, thereby preventing or at least reducing fire hazards in the assembly 100.

Referring now to FIG. 1C, illustrated is a section of an opening 108*a*1 within an illustrated section of the cold plate 104*a*. Note that an entirety of the opening 108*a*1 is not illustrated in FIG. 1C. The opening 108*a*1 has sidewalls 109*a* extending from a left surface of the cold plate 104*a* to a right surface of the cold plate 104*a*. A right edge 109*a* of the opening 108*a*1 is between the sidewalls 109*a* of the opening 108*a*1 and the right surface of the cold plate 104*a*. A left edge 109*b* of the opening 108*a*1 is between the sidewalls 109*a* of the opening 108*a*1 and the left surface of the cold plate 104*a*.

Similarly, each of the other openings of the assembly 100 also includes one or more sidewalls, a left edge, and a right edge. In the example of FIGS. 1A-1C, the openings 108 are illustrated to have a circular or oval cross-section, although the openings 108 may have another appropriate cross-section, such as a square, rectangular, or rhombus.

Referring now to FIG. 1D, illustrated is a cross-sectional view of the assembly 100 along line A-A' of FIG. 1B. Note that only a section of the assembly 100 including two example battery cells 116*a* and 118*a* are illustrated in FIG. 1D.

As described with respect to FIGS. 1A and 1B, and as also illustrated in FIG. 1D, the cold plates 104*a* and 104*b* are arranged parallel to each other, with the battery cells 116, 118 arranged laterally between the cold plates 104*a* and 104*b*. For example, each battery 116, 118 extend laterally from near one of the cold plates to near another of the cold plates. In an example, each battery cell 116, 118 is arranged to be substantially orthogonal to one or both the cold plates 104*a*, 104*b*.

As described above, each of the cold plates 104*a*, 104*b* includes corresponding openings 108*a* and 108*b*, respectively. For example, an opening 108*a*1 within the cold plate 104*a* and an opening 108*b*1 within the cold plate 104*b* are illustrated in FIG. 1D.

As described above, each battery cell 116, 118 has a cathode or positive terminal, and an anode or negative terminal. For example, as illustrated in FIG. 1D, the battery cell 116*a* has a corresponding positive terminal (marked by a "+" sign in FIG. 1D) facing the cold plate 104*b*, and a corresponding negative terminal (marked by a "−" sign in FIG. 1D) facing the cold plate 104*a*. Similarly, the battery cell 118*a* has a corresponding positive terminal (marked by a "+" sign in FIG. 1D) facing the cold plate 104*a*, a corresponding negative terminal (marked by a "−" sign in FIG. 1D) facing the cold plate 104*b*.

As illustrated in FIG. 1D, the positive terminal of the battery cell 116*a* is proximal to, e.g., adjacent to, the opening 108*b*1. For example, the positive terminal of the battery cell 116*a* is substantially aligned to the opening 108*b*1, e.g., such that an outgas event of the battery cell 116*a* will release outgases through a valve or membrane at or near the positive terminal of the battery cell 116*a*, and such outgases will exit the assembly 100 through the opening 108*b*1. In an example, the positive terminal of the battery cell 116*a* and the opening 108*b*1 are separated by at most 2 inches, or at most 1.5 inches, or at most 1 inch, or at most 0.8 inch, or at most 0.4 inch, or at most 0.2 inch, or at most 0.1 inch, or at most 0.08 inch, or at most 0.06 inch, or at most 0.05 inch, or at most 0.04 inch.

Similarly, as illustrated in FIG. 1D, the positive terminal of the battery cell 118*a* is proximal to, e.g., adjacent to, the opening 10*ab*1. For example, the positive terminal of the battery cell 118*a* is substantially aligned to the opening 108*a*1, e.g., such that an outgas event of the battery cell 118*a* will release outgases through a valve or membrane at or near the positive terminal of the battery cell 118*a*, and such outgases will exit the assembly 100 through the opening 108*a*1. In an example, the positive terminal of the battery cell 118*a* and the opening 108*a*1 are separated by at most 2 inches, or at most 1.5 inches, or at most 1 inch, or at most 0.8 inch, or at most 0.4 inch, or at most 0.2 inch, or at most 0.1 inch, or at most 0.08 inch, or at most 0.06 inch, or at most 0.05 inch, or at most 0.04 inch.

Note that because the outgases may not exit a battery cell from or near a corresponding negative terminal of the battery cell, the negative terminal of the battery cell may not have an adjacent opening in the cold plates, as illustrated in FIG. 1D. For example, a negative side ejection may be possible, but may be unlikely, e.g., given the manner in which individual battery cells are manufactured. In some examples, the negative terminals of the battery cells may be adjacent to the openings, e.g., instead of or in addition to the positive terminals of the battery cells being adjacent to the openings.

In one embodiment, the battery cells 116*a*, 118*a* are hold in place by a honeycomb like structure 122. The structure 122 is on sidewalls of the battery cells, where sidewalls of a battery cell extend from its positive terminal to its negative terminal, as illustrated in FIG. 1D. The structure 122 prevents or reduces movement of individual battery cells 116, 118 in the z axis direction (e.g., the vertical direction in FIG. 1D) and in the y axis direction (e.g., a direction that is in and out of the paper in FIG. 1D). In an example, the structure 122 comprises rigid material, e.g., comprising dielectric material, such as relatively rigid plastic. In another example, the structure 122 comprises rigid material, such as aluminum or another appropriate material, with holes or slots machined therewithin, to allow fitting a battery cell within a corresponding slot. Note that while the structure 122 is illustrated in FIG. 1D, the structure 122 is not illustrated in FIGS. 1A and 1B for purposes of illustrative clarity.

In one embodiment, the assembly 100 comprises a capture plate or holding plate 124 adjacent to the cold plate 104*a*, and another capture plate or holding plate 124 adjacent to the cold plate 104*b*. The plates 124 hold the corresponding battery cells 116, 118 in place. For example, each plate 124 has finger-like protrusions that at least in part restrict movement of the battery cells 116, 118 in the x-axis direction in the example orientation of the assembly 100 of FIG. 1D. In an example, the plates 124 comprise dielectric material. In an example, the plates 124 comprise epoxy resin or another appropriate dielectric material. Each plate 124 has openings or holes therewithin, which are aligned to the corresponding positive terminals of the battery cells and are aligned with the openings of the corresponding adjacent cold plate, as illustrated in FIG. 1D.

In one embodiment, the assembly 100 comprises a plurality of conductive bus bars or connection lines 132, such as bus bars or lines 132*a*, 132*b*, 132*c* in FIG. 1D. For example, line 132*a* couples the positive terminal of the battery cell 118*a* to the negative terminal of the battery cell 116*a*. Line 132*b* couples the negative terminal of the battery cell 118*a* to another component not illustrated in FIG. 1D (e.g., couples the negative terminal of the battery cell 118*a* to a positive terminal of another battery cell). Similarly, line 132*c* couples the positive terminal of the battery cell 116*a* to another component not illustrated in FIG. 1D (e.g., couples the positive terminal of the battery cell 116*a* to a negative terminal of another battery cell).

Thus, in FIG. 1A, the battery cells 118*a* and 116*a* are coupled in series through the lines 132*a*, 132*b*, 132*c*. However, in another example, another appropriate connection of the battery cells 116*a*, 118*a* (e.g., parallel connection) may also be possible.

In one embodiment, the lines 132*a*, 132*b*, 132*c* comprise conductive material, such as one or more metals and/or alloys thereof. Example metal for the lines 132*a*, 132*b*, 132*c* include copper, aluminum, nickel, and/or one or more other metals and/or metal alloys used in bus bars or lines of a battery assembly.

In one embodiment, the assembly comprises fire retardant dielectric material 130, such as dielectric foam 130 adjacent to a coupling between a battery terminal and a line 132. The foam 130 acts as fire retardant, e.g., to prevent or reduce chances of propagation of fire from a battery cell to outside of the battery cell.

Thermal pads (also referred to herein as gap pads) 126 are between (i) the cold plates and (ii) the plate 124, the lines 132*a*, 132*b*, 132*c*, and the foam 130. The thermal pads 126 act as thermal interface material between the cold plate and the battery cells 116, 118. For example, during operation of the battery assembly 100, the thermal pads 126 transfer heat from the battery cells 116, 118 to the cold plates 104*a*, 104*b*, e.g., to prevent or reduce chances of the battery cells 116, 118 being overheated. The thermal pads 126 comprise dielectric material having relatively high thermal conductivity. In an example, thermal pads 126 are also used to fill air gaps caused by imperfectly flat (or smooth) surfaces of the lines 132 and the plates 124. In an example, the thermal pads are relatively firm at room temperature, but become soft and may fill gaps between (i) the cold plates 104 and (ii) the lines 132 and the plates 124 at relatively higher temperatures.

As illustrated in FIG. 1D, each thermal pad 126 has an array of openings that is substantially aligned with the array of openings of the adjacent cold plate. For example, the space between the portion of the line 132*a* (e.g., which is coupled to the positive terminal of the battery cell 118*a*) and the cold plate 104*a* cannot be filled with the thermal pads 126, e.g., to allow empty space for possible venting of outgases from the positive terminal of the battery cell 118*a*. Similarly, the space between the portion of the line 132*c* (e.g., which is coupled to the positive terminal of the battery cell 116*a*) and the cold plate 104*b* cannot be filled with the thermal pads 126, e.g., to allow empty space for possible venting of outgases from the positive terminal of the battery cell 116*a*.

As illustrated in FIG. 1D, a portion of the line 132*a* and the cold plate 104*a* is separated by empty space or air, a minimum distance between the line 132*a* and the cold plate 104*a* is L1. Similarly, a portion of the line 132*c* and the cold plate 104*b* is separated by empty space or air, a minimum distance between the line 132*c* and the cold plate 104*b* is L2.

Lengths L1 and L2 are at most 1 inch, or at most 0.8 inch, or at most 0.4 inch, or at most 0.2 inch, or at most 0.1 inch, or at most 0.08 inch, or at most 0.06 inch, or at most 0.05 inch, or at most 0.04 inch, in an example. Note that the portion of the line 132*b* illustrated in FIG. 1D is not adjacent to the cold plate 104*b*, and is fully separated by the thermal pads 126 (which comprise dielectric material) from the cold plate 104*b*.

Figure 2:
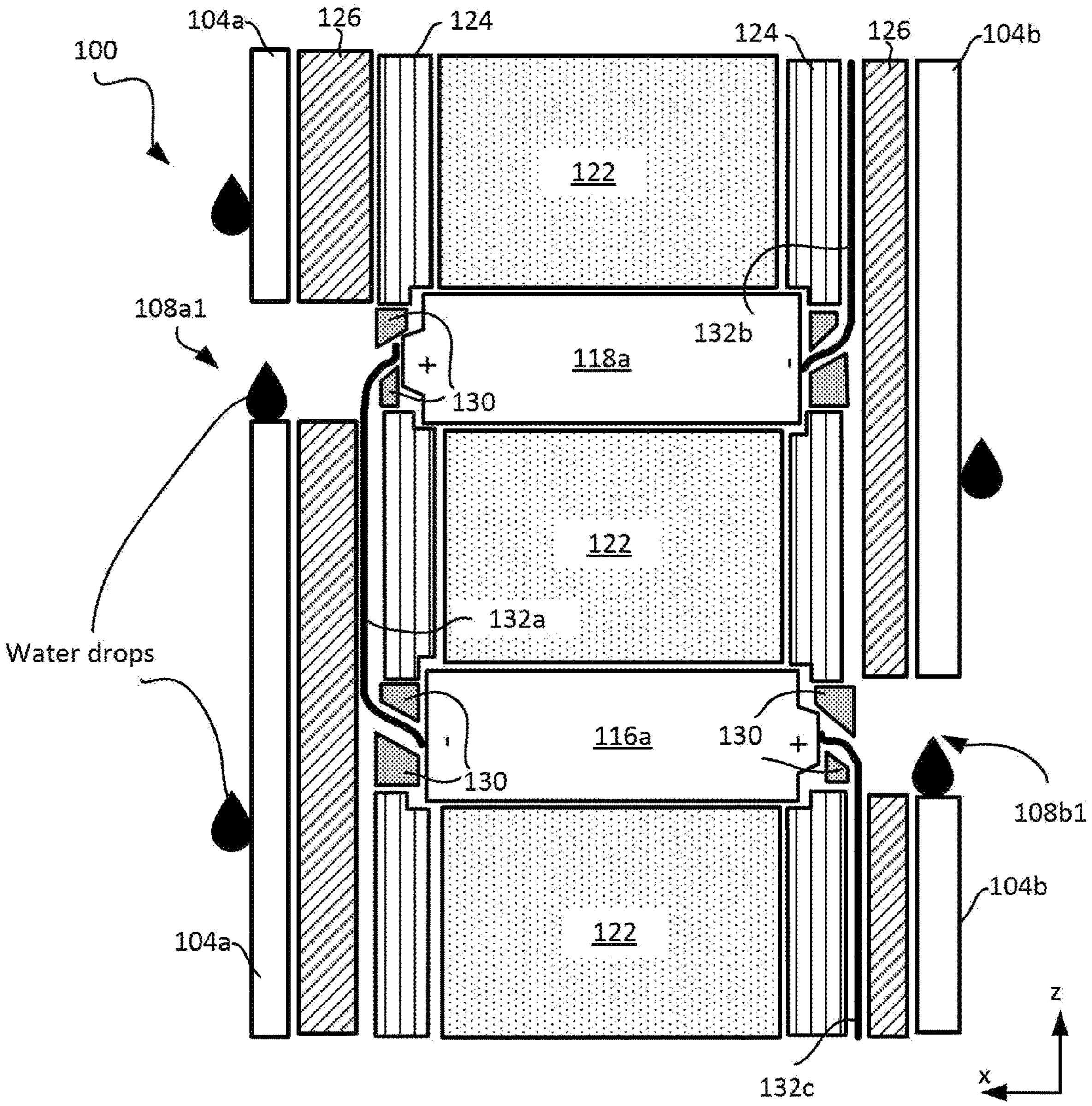
FIG. 2 illustrates the battery assembly of FIGS. 1A-D, and further schematically illustrates condensates deposited on cold plates of the battery assembly, in accordance with an embodiment of the present disclosure.

FIG. 2 illustrates the battery assembly 100 of FIG. 1D, and further schematically illustrates condensates deposited on the cold plates 104*a*, 104*b* of the battery assembly 100, in accordance with an embodiment of the present disclosure. For example, the cold plates 104*a*, 104*b* are relatively cold, e.g., colder than the ambient air within which the assembly 100 operates. Accordingly, there is moisture condensate on walls of the cold plates 104*a*, 104*b*. For example, FIG. 2 illustrates drops of water of the cold plates 104*a*, 104*b*. The water drops can be on side surfaces of the cold plates 104*a*, 104*b*, e.g., adhered to the side surfaces due to surface tension. Furthermore, water tends to drip and accumulate or pool on bottom sidewalls of the openings 108*a*1, 108*b*1, as illustrated in FIG. 2. For example, water from the side surfaces of the cold plates 104*a*, 104*b* drips and comes downwards (e.g., due to gravity), and tends to accumulate on the bottom sidewalls of the openings 108*a*1, 108*b*1.

FIG. 3 illustrates dielectric material coating 308 on the cold plates 104*a*, 104*b* of the battery assembly 100 of FIGS. 1D and 2, and further schematically illustrates weak points for electrical shorting between conductive lines 132*a*, 132*c* and the cold plates 104*a*, 104*b*, respectively of the battery assembly 100, in accordance with an embodiment of the present disclosure.

For example, a magnified view of 304 of a section of the cold plate 104*a* is illustrated in FIG. 3. As illustrated, the cold plate 104*a* has one or more layers of coating 308 of dielectric material. The cold plate 104*b* has similar coating of dielectric material.

As illustrated, the coating 308 is thicker on non-edge surfaces of the cold plate 104*a* and thinner on edges of the openings of the cold plate 104*a*. For example, edges 312 of the opening 108*a*1 are labelled in FIG. 3, where the edges 312 are also illustrated as edges 109*a* and 109*b* in FIG. 1C. In an example, the coating 308 is relatively thin on the edges of the openings (e.g., compared to a thickness of the coating 308 on non-edge surfaces of the plate 104*a*). For example, coating 308 on non-edge surfaces can have a thickness of 0.005 to 0.01 inch thickness, e.g., have a thickness of at least 0.003 inch, or at least 0.005 inch, or at least 0.008 inch, or at least 0.01 inch, or at least 0.015 inch, or at least 0.02 inch. In contrast, the thickness of the coating 308 on the edges 312 of the opening 108*a*1 may be less than 0.003 inch, or less than 0.002 inch, or less than 0.001 inch, for example. This difference in thickness is illustrated in section 304 of the cold plate in FIG. 3.

The thinner dielectric material coating on the edges 312 may be due to deposition techniques used to deposit the coatings 308 on the cold plate 104*a*. For example, when coating the cold plate 104*a* (e.g., using any appropriate paint deposition techniques), thickness of the coating 308 on the non-edge surfaces become inherently more than a thickness of the coating 308 on the edges 312, e.g., due to unintended limitations on the coating deposition process. For example, after the coating is deposited on the cold plate 104*a*, retention of the coating 308 on the edges 312 is relatively low, compared to a retention of the coating 308 on the non-edge surfaces of the cold plate 104*a*. For example, the coating may not sufficiently bind to the edges 312, compared to the binding of the coating 308 on the non-edge surfaces of the cold plate 104*a*.

Furthermore, in an example, the battery assembly 100 is installed within an aircraft, e.g., within a pressurized section of the aircraft or within a section of the aircraft that is not pressurized. In an example, the air pressure within the aircraft and consequently adjacent to the battery assembly may decrease as and when the aircraft gains altitude, which may increase air conductivity (e.g., air is more conductive at lower air pressure). Additionally, or alternatively, due to presence of higher energy particles from the space at higher altitudes (where presence of such higher energy particles diminishes proximate to the earth's surface), the electrical conductivity at higher altitude may be higher than that at the sea level.

In an example, thus, (i) water droplets accumulate on or near edges 312 of the opening 108*a*1 of the cold plate 104*a*, (ii) thickness of the coating 308 at or near the edges is relatively less, (iii) distance between the line 132*a* and the edge 312 of the cold plate 104*a* (e.g., the length L1 of FIG. 2) is relatively less, as described above, (iv) the battery assembly 100 may have relatively high voltage at the positive terminal of the battery 118*a* (e.g., which may be about 800 V in an example implementation), and/or (v) the battery assembly 100 may be rated to operate at a higher altitude (e.g., when the aircraft, in which the battery assembly is installed, is flying high in the air) at which air is more conductive than at sea level.

In an example, one or more of the above factors may contribute to an electrical arcing or shorting 320 between the line 132*a* and the cold plate 104*a*, as schematically illustrated by the line 320 in FIG. 3. In an example, similar electrical arcing or shorting between the line 132*c* and the cold plate 104*b* may also occur, although not illustrated in FIG. 3.

FIG. 4 illustrates another dielectric material coating 408 on the cold plates 104*a*, 104*b* of the battery assembly 100 of FIGS. 1D and 2, where the coating 408 has at least a threshold thickness T1 on edges 312 of an opening 108*a*1 of a cold plate 104*a*, in accordance with an embodiment of the present disclosure. In an example, the thickness T1 of the coating 408 on edges 312 of the cold plate 104*a* is at least 0.002 inch, or at least 0.003 inch, or at least 0.004 inch, or at least 0.005 inch, or at least 0.006 inch, or at least 0.007 inch, or at least 0.008 inch, or at least 0.01 inch, or at least 0.012 inch, or at least 0.015 inch, for example.

Also, an average thickness T2 of the coating 408 on non-edge surfaces of the cold plate 104*a* is at least 0.005 inch, or at least 0.007 inch, or at least 0.009 inch, or at least 0.01 inch, or at least 0.02 inch, or at least 0.025 inch, or at least 0.03 inch, for example.

In an example, in FIG. 4, due to the increased thickness of coating 408 at or near edges 312 of the cold plate 104*a* (e.g., compared to the thickness illustrated in FIG. 3) and/or due to a judicious choice of the dielectric material used for the coating 408, chances of electrical shorting between the cold plate 104*a* and the line 132*a* is eliminated, or at least reduced in FIG. 4. Thus, even if (i) water droplets accumulate on or near edges 312 of the opening 108*a*1 of the cold plate 104*a*, (ii) distance between the line 132*a* and the edge 312 of the cold plate 104*a* (e.g., the length L1 of FIG. 2) is relatively less, (iii) relatively high voltage is at the positive terminal of the battery 118*a* (e.g., which may be about 800 V in an example implementation), and/or (iv) the battery assembly 100 may be rated to operate at a higher altitude at which air is more conductive than at sea level, the thicknesses T1 and T2 and/or choice of the dielectric material coating 408 eliminate or at least reduce chances of electrical shorting between the cold plate 104*a* and the line 132*a*. Similarly, the thickness and/or choice of the dielectric material coating 408 eliminate or at least reduce chances of electrical shorting between the cold plate 104*b* and the line 132*c* (and between any of the cold plates 104*a*, 104*b* and any of the lines of the assembly 100). Thus, in contrast to FIG. 3, no electrical shorting may occur in the battery assembly of FIG. 4.

The coating 408 may include an appropriate dielectric material that binds satisfactorily on edges of the openings of the cold plates, and that has sufficient dielectric properties. Examples of the coating 408 include ethylenechlorotrifluoroethylene (ECTFE), a semi-crystalline melt processable partially fluorinated polymer, thermoplastic powder coating, and/or another appropriate type of dielectric material coating.

Figure 5:
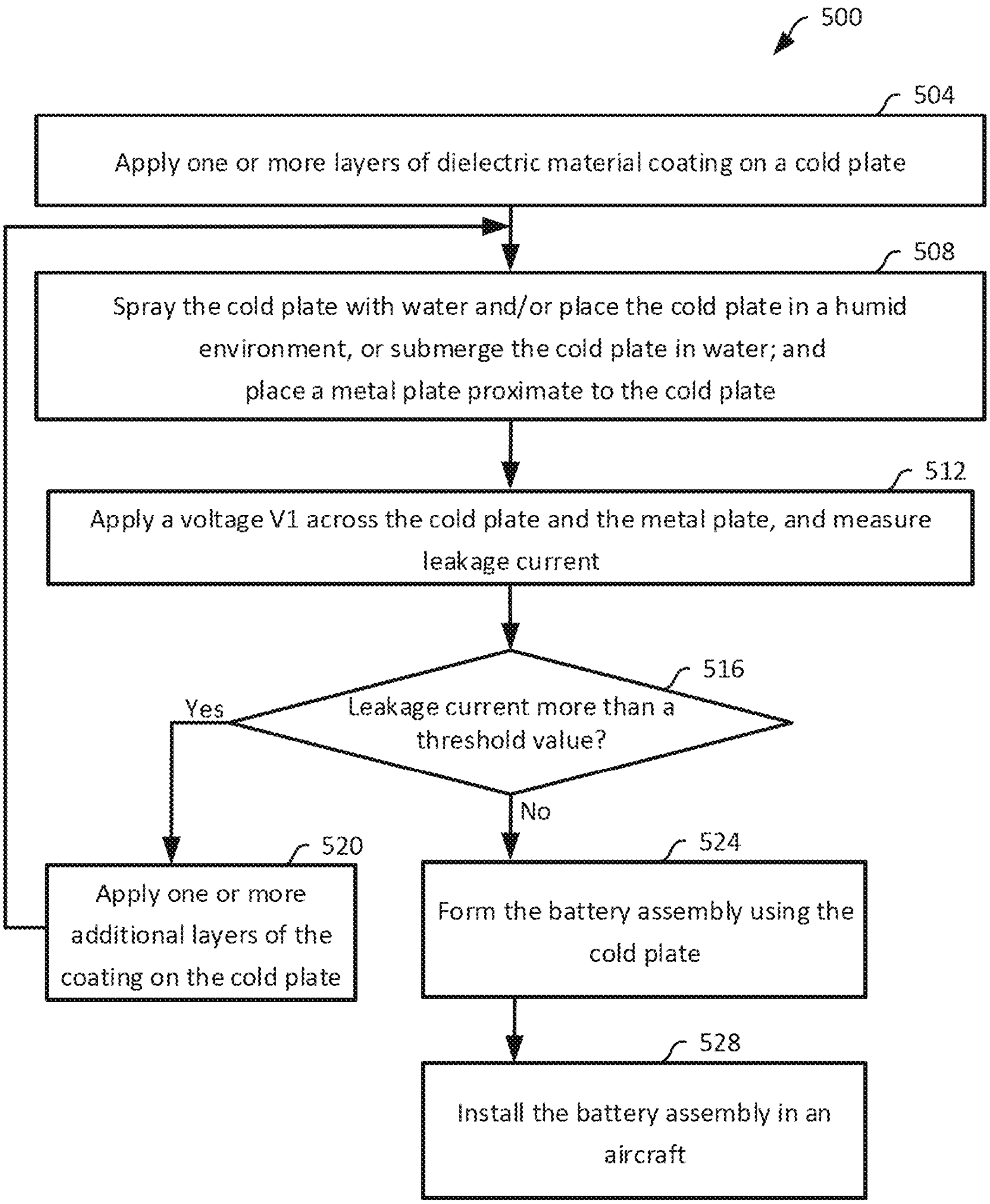
FIG. 5 illustrates a flowchart depicting a method for testing a cold plate (such as any of the cold plates of FIGS. 1A-D, 2 and 4) and manufacturing a battery assembly including the cold plate, such that chances of electrical shorting between conductive line(s) of the battery assembly and the cold plate(s) is eliminated or at least reduced, in accordance with an embodiment of the present disclosure.
Figure 6A:
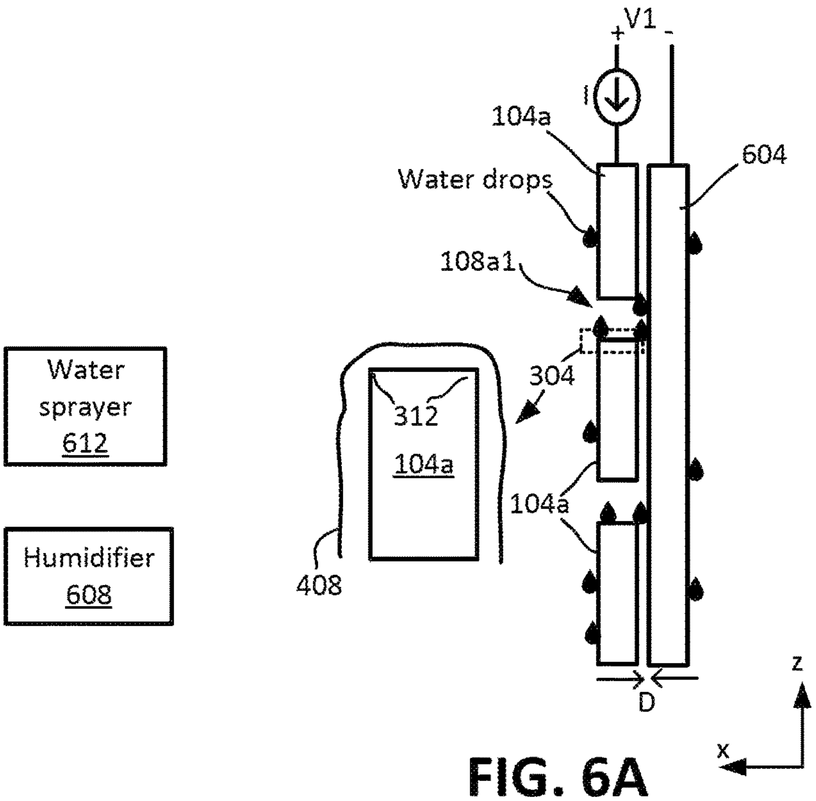
FIGS. 6A and 6B illustrate testing arrangements for testing the cold plate(s) according to the methodology of FIG. 5, in accordance with an embodiment of the present disclosure.
Figure 6B:
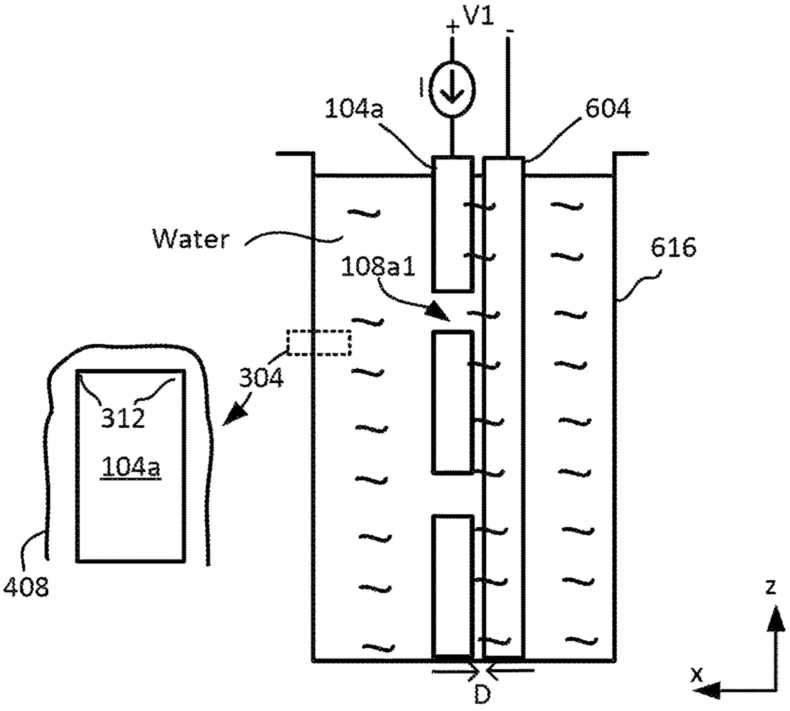

FIG. 5 illustrates a flowchart depicting a method 500 for testing a cold plate (such as any of the cold plates 104*a*, 104*b* of FIGS. 1A, 1B, 1C, 1D, 2 and 4) and manufacturing a battery assembly 100 including the cold plate, such that chances of electrical shorting between conductive lines 132 of the battery assembly 100 and the cold plate is eliminated or at least reduced, in accordance with an embodiment of the present disclosure. FIGS. 6A and 6B illustrate testing arrangements for testing the cold plate according to the methodology 500 of FIG. 5, in accordance with an embodiment of the present disclosure. FIGS. 5, 6A, and 6B will be discussed in unison.

Referring to FIG. 5, at 504 of the method 500, one or more layers of dielectric material coating (e.g., coating 408 of FIG. 4) are applied on the cold plate (such as the cold plate 104*a*). The coating may be applied using an appropriate technique used to apply coating on a cold plate.

As described herein, the coating may not bind or adhere to the edges of the openings of the cold plate, as compared to non-edge surfaces of the cold plate. For example, the coating on the edges of the openings of the cold plate may be less than T1 (see FIG. 4), as described with respect to FIG. 3, which may consequently increase chances of electrical shorting between the cold plate and the lines 132 (see FIG. 3). Accordingly, subsequent to applying the coatings, the cold plate may be tested to check satisfactory performance of the cold plate, as described below.

The method 500 proceeds from 504 to 508. At 508, the cold plate is sprayed with water and/or placed in a humid environment, e.g., as illustrated in FIG. 6A. Alternatively, the cold plate is submerged in water, e.g., as illustrated in FIG. 6B. Furthermore, a metal plate 604 is placed proximate to the cold plate, as illustrated in FIGS. 6A and 6B. Thus, the cold plate and the metal plate 604 are exposed to moisture and/or water.

For example, in FIG. 6A, the cold plate 104 is sprayed with water from a water sprayer 612. The water sprayer 612 may be a water spray bottle, or a sprayer attached to a water pipe, or a water tap, which may be manually or automatically operated to spray water on the cold plate 104, in an example. In an example, in addition to, or instead of spraying the water, a water humidifier 608 is operated proximal to the cold plate 104*a*. The water humidifier 608 humidifies the environment, e.g., by releasing water vapor or steam and increasing moisture level in the air proximal to the cold plate 104*a*. Accordingly, due to the spraying of the water and/or the operation of the water humidifier 608, water droplets are formed on surfaces of the cold plate 104*a* and on sidewalls of the openings of the cold plate 104*a*, as schematically illustrated in FIG. 6A.

As also illustrated in FIG. 6A, a metal plate 604 is placed proximal to the cold plate 104*a*. In an example, the metal plate 604 doesn't have any dielectric material coating thereon. The metal plate 604 is separated from the cold plate 104*a* by a lateral distance D. In an example, the distance D is at most 1 inch, or at most 0.8 inch, or at most 0.7 inch, or at most 0.5 inch, or at most 0.3 inch, or at most 0.1 inch, or at most 0.05 inch, or at most 0.03 inch, for example, In one example, the distance D is substantially zero ($D \approx 0$), in which case at least a section of the cold plate 104*a* and at least a section of the metal plate 604 are in contact with each other.

In FIG. 6B, the cold plate 104 and the metal plate 604 are separated by the distance D described above, and the combination of the cold plate 104 and the metal plate 604 are submerged in water within a container 616.

Thus, in FIGS. 6A and 6B, water drops (FIG. 6A) or water (FIG. 6B) are on sidewalls and edges of the openings of the cold plate 104*a*. This mimics the conditions (e.g., water drops on sidewalls and edges of the openings of the cold plate 104*a*) described above with respect to FIGS. 3 and 4.

The method 500 then proceeds from 508 to 512. At 512, a voltage V1 is applied across the cold plate 108*a*1 and the metal plate 604, and leakage current I is measured, as illustrated in FIGS. 6A and 6B. If the dielectric material coating is applied satisfactorily at process 504 (e.g., edges of the openings have sufficiently thick coating of at least T1 thickness, see FIG. 4), then the coating 408 would prevent substantial current I between the metal plate 604 and the cold plate 104*a*, e.g., as described above with respect to FIG. 4. However, if the dielectric material coating is not applied satisfactorily at process 504 (e.g., edges of the openings doesn't have sufficiently thick coating, see FIG. 3), then the coating may not be able to prevent leakage current between the metal plate 604 and the cold plate 104.

Accordingly, in an example, a high value of the current I (e.g., the current I being above a threshold current value) at process 512 (also illustrated in FIGS. 6A and 6B) is an indication of electrical shorting between the metal plate 604 and cold plate 104*a*, which in turn is an indication of weak coating on the cold plate 104*a* (e.g., less than sufficient thickness of the coating at edges of the openings).

Assume that when the battery assembly 100 is operational, the battery assembly 100 outputs a voltage Va. In an example, the voltage V1 applied for the testing at process 512 is greater than Va. In an example, the testing voltage V1 is greater than operational voltage Va of the battery assembly 100, to maintain a safety margin, as well as to account for the fact that the battery assembly 100 is rated to operate at higher altitude at which air is more conductive (e.g., due to presence of higher energy particles from space and/or due to decreased air pressure, which contribute to higher air conductivity).

For example, the testing of FIGS. 6A and 6B may be carried out at a test facility that has a ground level air pressure (e.g., which may be slightly different than seal level air pressure, depending on an elevation of the physical facility where the testing is being performed). However, the battery assembly 100 may be, in an example, installed in an aircraft that may reach high altitude during its flight, during which air conductivity may be less than that of the ground level, for reasons described above.

Accordingly, a "rated altitude" of the battery assembly may be substantially higher than a "testing altitude" (e.g., an altitude at which the testing of FIGS. 6A and 6B are performed). For example, the rated altitude of the battery assembly may be higher than the testing altitude by at least 1,000 ft, or at least 2,000 ft, or at least 5,000 ft, or at least 10,000 ft, or at least 15,000 ft, or at least 20,000 ft, depending on an altitude at which the aircraft is rated to fly. Also, as described above, an increase in altitude results in a corresponding increase in electrical conductivity of the air, which correspondingly increases chances of electrical shorting described above.

Accordingly, to compensate for the rated altitude of the battery assembly being higher than the testing altitude, as well as to maintain a safety margin of the testing process, the testing voltage V1 of FIGS. 6A and 6B is higher than the operational voltage Va of the battery assembly 100. For example, the testing voltage V1 is at least 1.2×, or 1.5×, or 2×, or 2.5×, or 2.8×, or 3×, or 3.5×, or 4×, or 4.5×, or 5× of the operational voltage Va (where at least 1.2×, for example, implies that V1 is at least 1.2 times Va). Merely as an example, the operational voltage Va of the battery assembly 100 may be about 800 V, and the testing voltage V1 of the battery assembly 100 may be about 3,000 V, or 3,500 V, or 3,550 V, for example, although actual voltages may be implementation specific.

In an example, the voltage may be applied for at least a threshold period of time. For example, the testing may be formed for at least 60 seconds, although such a threshold period of time may be implementation specific.

The method 500 proceeds from 512 to 516. At 516, a determination is made as to whether the leakage current I (see FIGS. 6A and 6B) is more than a threshold current value. In an example, the threshold current value may be 0.2 milli Ampere (mA), or 0.5 mA, or 0.7 mA, or 1 mA, or 1.2 mA, or 1.5 mA, or 2 mA, or 5 mA, or 10 mA. In an example, the threshold current value may depend on a sensitivity of the battery assembly 100 to leakage current between the cold plate and the conductive lines 132, and/or may depend on a criticality of the operation for which the battery assembly 100 is to be deployed.

If yes at 516 (e.g., the leakage current I is more than the threshold current value), this implies that the coating at process 504 is not sufficient to avoid the above described electrical shorting. For example, the coating at the edges 312 may be insufficient, as described above with respect to FIG. 3. Accordingly, if yes at 516, the method 500 proceeds from 516 to 520. At 520, one or more additional layers of the coating is reapplied on the cold plate. Subsequently, the method 500 loops back to 508, where the water is re-sprayed on the cold plate and/or the cold plate is placed in the humid environment, or the cold plate is submerged in water, and the testing of the cold plate at 512 is performed again between the cold plate and the metal plate.

On the other hand, if "No" at 516, (e.g., the leakage current I is less than the threshold current value), this implies that the coating at process 504 is sufficient to avoid the above described electrical shorting. For example, the coating at the edges 312 is sufficient, as described above with respect to FIG. 4. Accordingly, if "No" at 516, the method 500 proceeds from 516 to 524. At 524, the battery assembly 100 is formed using the cold plate that is coated and tested in accordance with processes 504-520. For example, each cold plate 104*a*, 104*b* used for the battery assembly 100 may be coated and tested in accordance with processes 504-520. The structure of the battery assembly 100 has been described above with respect to FIGS. 1A-1D. The battery assembly 100 may be formed using appropriate techniques for forming such a battery assembly.

The method 500 proceeds from 524 to 528. At 528, the battery assembly 100 described above may be installed within an aircraft, in an example. In other examples, the battery assembly 100 may be installed for other appropriate applications as well.

Note that the processes in method 500 are shown in a particular order for ease of description. However, one or more of the processes may be performed in a different order or may not be performed at all (and thus be optional), in accordance with some embodiments. Numerous variations on method 500 and the techniques described herein will be apparent in light of this disclosure.

Figure 7A:
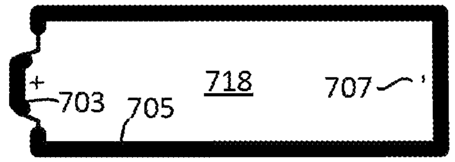
FIG. 7A illustrates an example type of battery cell.
Figure 7B:
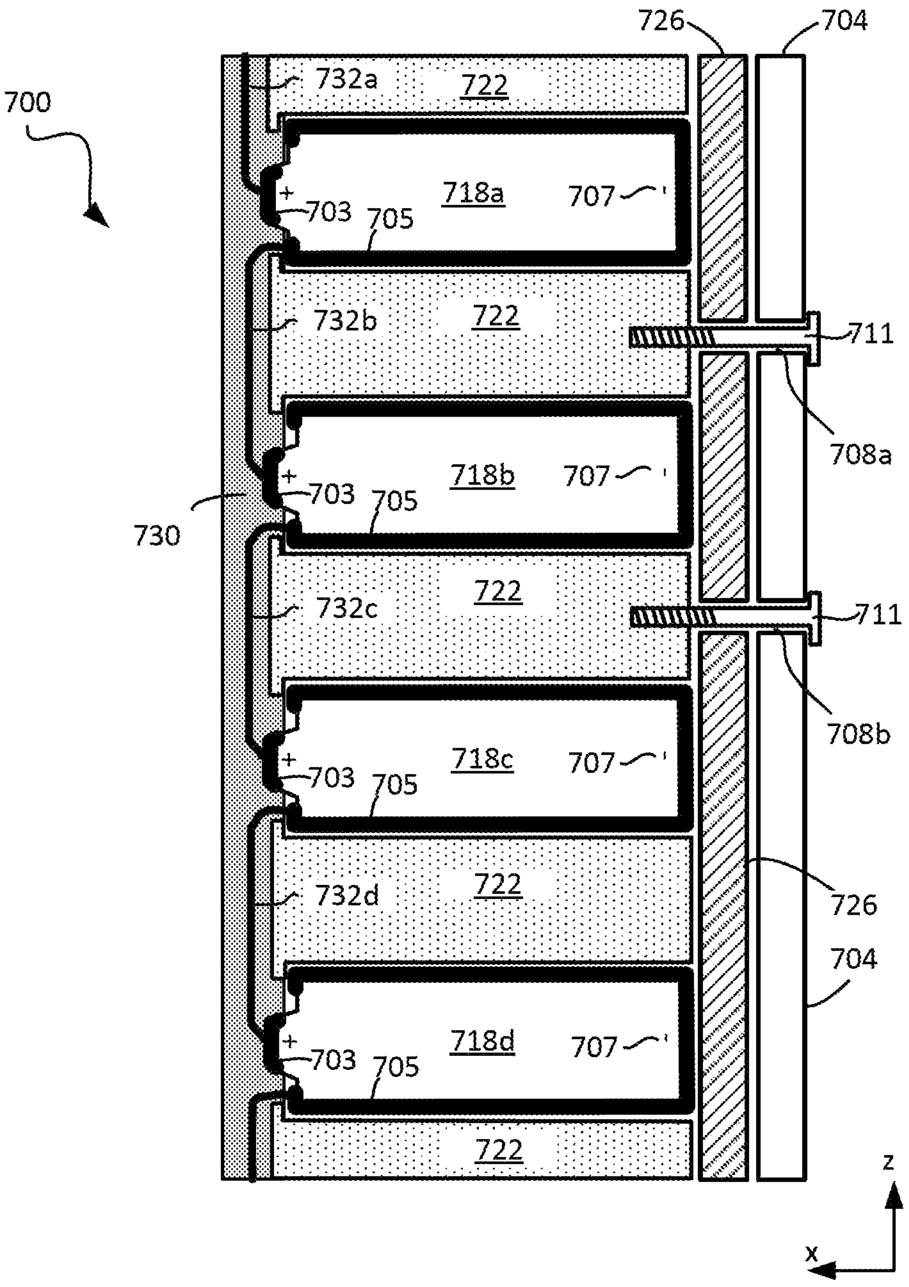
FIG. 7B illustrates another example battery assembly comprising a plurality of the battery cells of FIG. 7A, in accordance with an embodiment of the present disclosure.

FIG. 7A illustrates an example type of battery cell 718, and FIG. 7B illustrates another example battery assembly 700 comprising a plurality of the battery cells 718 of FIG. 7A, in accordance with an embodiment of the present disclosure.

Referring to FIG. 7A, a positive terminal 703 of the battery cell 718 is on one side of the battery cell 718 (marked with a "+" sign), and a negative terminal 707 of the battery cell 718 is on another side of the battery cell 718 (marked with a "−" sign). The battery cell 718 further comprises a conductive shell 705 wrapped at least in part around the battery cell 718 and coupled to the negative terminal 707 of the battery cell 718. The conductive shell 705 is also referred to herein as conductive outer surface 705 of the battery cell 718.

The conductive outer surface 705 comprises conductive material, such as one or more metals and/or alloys thereof. The conductive outer surface 705 forms an extension of the negative terminal 707. For example, a conductive line couple to any part of the conductive outer surface 705 is electrically coupled to the negative terminal 707. Note that the conductive outer surface 705 wraps at least in part around the sidewalls between the positive and negative terminals of the battery cell 718, and conducts current.

As illustrated, both the positive terminal 703 and a part of the conductive outer surface 705 are on a same side (e.g., left side in the orientation of FIG. 7A) of the battery cell 718. Accordingly, both the positive and negative terminals of the battery cell 718 may be accessed from a same side of the battery cell 718.

Referring now to FIG. 7B, the battery assembly 700 comprises a single cold plate 704*a*. In an example, the cold plate 704*a* comprises thermally conductive material, such as one or more metals and/or alloys thereof, which are coated with one or more layers of dielectric coating material 708 (see FIG. 7C). The cold plate 704 provides cooling of the battery assembly 700, e.g., by transferring heat from the assembly 700 to coolant that flows through coolant tubes and/or to the ambient. The coolant tubes are not illustrated in FIG. 7B, and may be similar to the coolant tubes 112_a_, 112_b_ described above with respect to the battery assembly 100.

In one embodiment, a plurality of battery cells 718 are arranged to extend laterally from the cold plate 704. Some such example battery cells 718_a_, 718_b_, 718_c_, 718_d_ are illustrated in FIG. 7B.

In an example, each battery cell 718 is substantially orthogonal to the cold plate 704. Each battery cell 718 has a cathode or positive terminal 703, and an anode or negative terminal 707. The battery cells 718 have corresponding negative terminals 707 facing the cold plate 704, as illustrated. Thus, unlike the battery assembly 100, in the battery assembly 700 the negative terminals 707 of each battery 718 faces the cold plate 704. Because the negative terminals 707 of the battery cells 718 are facing the cold plate 704, the cold plate 704 need not have openings for venting outgases.

A thermal pad (also referred to herein as gap pads) 726 is between the cold plate 704 and battery cells 718. Note that the cold plate 704 is on one side of the battery cells 718, and accordingly, the thermal pad 726 is also on the same side of the battery cells 718. The thermal pad 726 acts as thermal interface material between the cold plate and the battery cells 116, 118. For example, during operation of the battery assembly 700, the thermal pad 726 transfers heat from the battery cells 718 to the cold plate 704, e.g., to prevent or reduce chances of the battery cells 718 being overheated. The thermal pad 726 comprises dielectric material having relatively high thermal conductivity.

In one embodiment, the battery cells 718 are hold in place by a honeycomb like structure 722. The structure 722 is on sidewalls of the battery cells 718, where sidewalls of a battery cell extend from its positive terminal to its negative terminal, as illustrated in FIG. 7B. The structure 722 prevents or reduces movement of individual battery cells 718 in the z axis direction (e.g., the vertical direction in FIG. 7B) and in the y axis direction (e.g., a direction that is in and out of the paper in FIG. 7B). In an example, the structure 722 also includes finger-like protrusions near the positive terminals 703 of the battery cells, and such protrusions prevent or at least reduce movement of individual battery cells 718 towards the left side along the x-axis direction for the orientation of FIG. 7B. Thus, unlike the battery assembly 100 of FIG. 1 (e.g., which had the capture plate or holding plate 124), there is no capture plate or holding plate in the battery assembly 700 of FIG. 7B. In an example, and the structure 722 also acts as the capture plate. However, in another example, in the battery assembly 700, there may be a separate capture plate, similar to the battery assembly 100.

In an example, the structure 722 comprises rigid material, e.g., comprising dielectric material, such as relatively rigid plastic. In another example, the structure 722 comprises rigid material, such as aluminum or another appropriate material.

In one embodiment, the assembly 700 comprises a plurality of conductive bus bars or connection lines 732, such as bus bars or lines 732_a_, 732_b_, 732_c_, 732_d_ in FIG. 7B. Note that as discussed with respect to FIG. 7A, the negative terminal 707 of a battery cell 718 is electrically extended to the same side as the positive terminal 703 by the conductive shell or outer surface 705. Accordingly, both the positive and negative terminals are tapped from the same side of a battery cell 178, such as the left side in the orientation of FIG. 7B.

Thus, conductive line 732_b_ couples a negative terminal of the battery cell 718_a_ to a positive terminal of the battery cell 718_b_; conductive line 732_c_ couples a negative terminal of the battery cell 718_b_ to a positive terminal of the battery cell 718_c_; conductive line 732_d_ couples a negative terminal of the battery cell 718_c_ to a positive terminal of the battery cell 718_d_, and so on. Thus, the battery cells 718_a_, 718_b_, 718_c_, and 718_d_ are coupled in series through the lines 732_a_, 732_b_, 732_c_, 732_d_. However, in another example, another appropriate connection of the battery cells 718 (e.g., parallel connection) may also be possible.

In one embodiment, the lines 732 comprise conductive material, such as one or more metals and/or alloys thereof. Example metal for the lines 732 include copper, aluminum, nickel, and/or one or more other metals and/or metal alloys used in bus bars or lines of a battery assembly.

In one embodiment, the assembly 700 comprises fire retardant dielectric material 730, such as dielectric foam 730 adjacent to a coupling between a battery terminal and a line 732. The foam 730 acts as fire retardant and thermal barrier, e.g., to prevent or reduce chances of propagation of fire from a battery cell to outside of the battery cell.

The foam 730 is illustrated to be a continuous foam in FIG. 7B, with the conductive lines 732 extending therewithin. However, the foam 730 may be discontinuous and/or may have openings, such as the foam 130 of the battery assembly 100 described earlier.

Note that because the negative terminals 707 of the battery cells 718 are facing the cold plate 704, the cold plate 704 need not have openings for venting outgases. The foam 730 is not rigid, and the outgases from a positive terminal 703 of a battery assembly 718 may be vented through the form 730. For example, during such a venting process, the foam 730 may rupture, to form a path for venting the outgases. In another example, although not illustrated in FIG. 7B, the foam 730 may have openings for venting the outgases (e.g., similar to the openings within the foam 130 of the battery assembly 100 described above).

In one embodiment, the assembly 700 comprises a plurality of mounting hardware 711, such as bolts or screws. The mounting hardware 711 mounts the thermal pads 726 and the cold plate 704 to the structure 722, as illustrated. For example, the mounting hardware 711 holds the thermal pads 726 and the cold plate 704 in place relative to the structure 722. For example, a mounting hardware 711 has a first end on an outer surface of the cold plate 704, and a second side that is screwed or bolted within the structure 722, e.g., to secure the cold plate 704 in place.

In one embodiment, the cold plate 722 has openings 708 (such as example openings 708_a_, 708_b_) through which the mounting hardware 711 are inserted within the cold plate 704. Note that unlike the battery assembly 100, in the battery assembly 700, the openings 708 are not aligned with the battery cells 718. Rather, the openings are aligned with the structure 722. A number of openings 708 within the cold plate 704 is based on a desired number of the mounting hardware 711 to be used to secure the cold plate 704 to the structure 722.

Figure 7C:
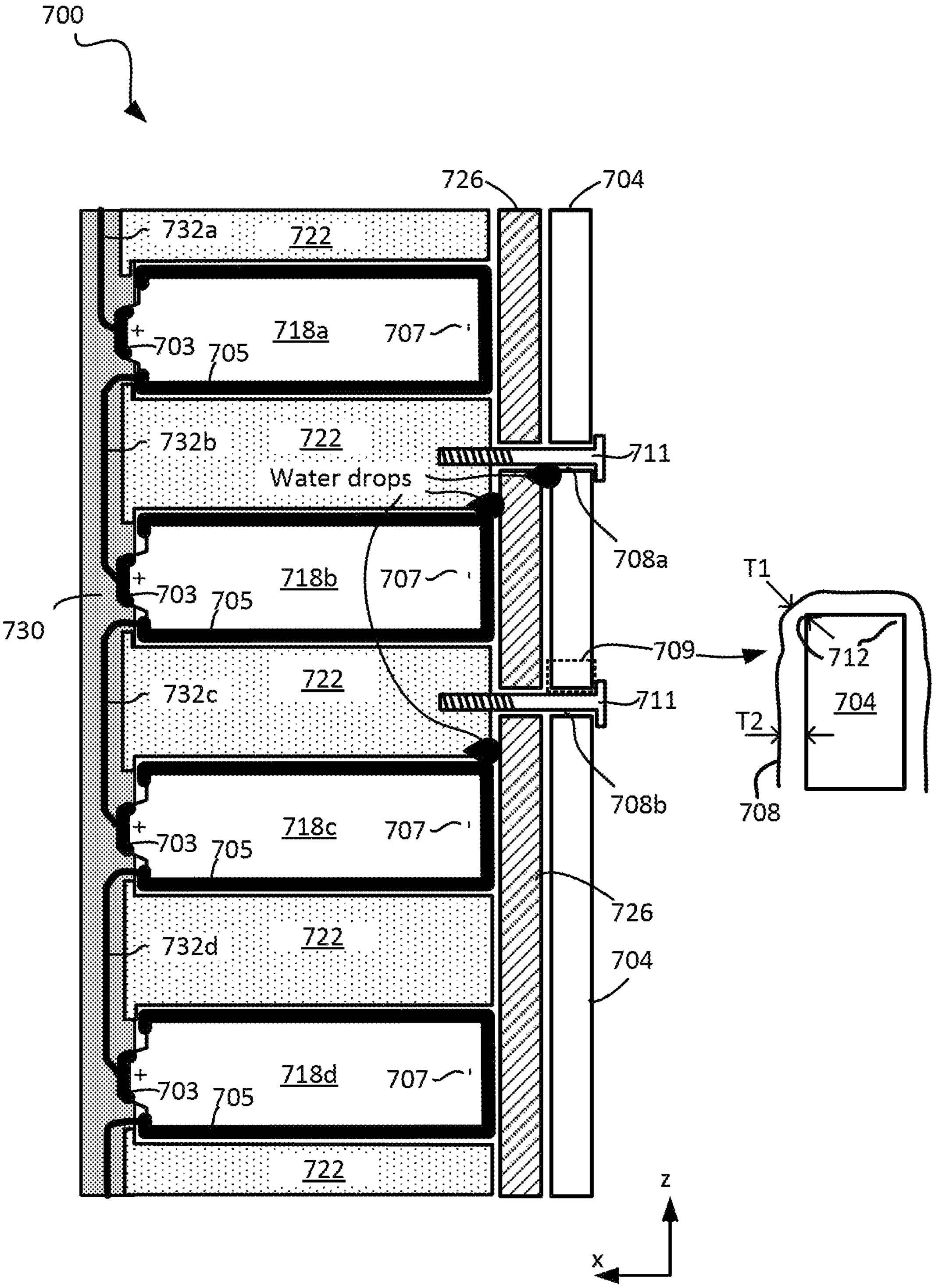
FIG. 7C illustrates example locations of water drops within the battery assembly of FIG. 7B, in accordance with an embodiment of the present disclosure.

In an example, water can enter the openings 708, e.g., through capillary or wicking action, due to surface tension, and/or due to gravity. FIG. 7C illustrates example locations of water drops within the battery assembly 700 of FIG. 7B, in accordance with an embodiment of the present disclosure. Note that unlike the battery assembly 100, in the battery assembly 700, the openings 708 of the cold plate 704 are not close to any of the conductive lines 732. Rather, the openings 708 of the cold plate 704 are now close to the conductive shell or outer surface 705 of the battery cells 718. For example, water drops may increase chances of electrical shorting between an edge of an opening 708 and the conductive shell or outer surface 705 of an adjacent battery cell 718.

FIG. 7C also illustrates a dielectric material coating 708 on the cold plate 704 of the battery assembly 700, where the coating 708 has at least a threshold thickness T1 on edges 712 of an opening 708 of the cold plate 704. In an example, the thickness T1 of the coating 708 has been described above with respect to FIG. 4. For example, the thickness T1 on edges 712 of the cold plate 704 is at least 0.002 inch, or at least 0.003 inch, or at least 0.004 inch, or at least 0.005 inch, or at least 0.006 inch, or at least 0.007 inch, or at least 0.008 inch, or at least 0.01 inch, or at least 0.012 inch, or at least 0.015 inch, for example. Also, an average thickness T2 of the coating 708 on non-edge surfaces of the cold plate 704 is at least 0.005 inch, or at least 0.007 inch, or at least 0.009 inch, or at least 0.01 inch, or at least 0.02 inch, or at least 0.025 inch, or at least 0.03 inch, for example.

In an example, in FIG. 7C, due to the increased thickness of coating 708 at or near edges 712 of the cold plate 704 (e.g., compared to the thickness illustrated in FIG. 3) and/or due to a judicious choice of the dielectric material used for the coating 708, chances of electrical shorting between the cold plate 704 and the conductive outer surface 705 is eliminated, or at least reduced, e.g., similar to the above description with respect to the battery assembly 100.

In an example, the cold plate 704 is tested and the battery assembly 700 is manufactured at least in part in accordance with the method 500 of FIG. 5 described above.

Further Example Embodiments

The following examples pertain to further embodiments, from which numerous permutations and configurations will be apparent.

Example 1. A battery assembly comprising: a cold plate comprising conductive material and coated with dielectric coating, the cold plate comprising an array of openings therewithin; a battery adjacent to the cold plate; and a conductive line coupled to a positive terminal of the battery; wherein a distance between (i) an edge of an opening in the array of openings and (ii) one or both the conductive line and the battery is at most 0.4 inch.

Example 2. The battery assembly of example 1, wherein the cold plate is a first cold plate, the battery is a first battery, the positive terminal is a first positive terminal, the array of openings is a first array of openings, wherein the first positive terminal of the first battery is adjacent to and substantially aligned with a first opening of the first array of openings; and wherein the battery assembly further comprises: a second cold plate that is substantially parallel to the first cold plate, the second cold plate comprising conductive material and coated with dielectric coating, the second cold plate comprising a second array of openings therewithin; and a second battery having a second positive terminal that is adjacent to and substantially aligned with a second opening of the second array of openings.

Example 3. The battery assembly of example 2, wherein: a first negative terminal of the first battery faces the second cold plate and is not aligned to any opening of the second array of openings; and a second negative terminal of the second battery faces the first cold plate and is not aligned to any opening of the first array of openings.

Example 4. The battery assembly of any one of examples 2-3, further comprising: a structure comprising aluminum, wherein the structure includes at least a first slot and a second slot, and wherein the first battery is within the first slot and the second battery is within the second slot.

Example 5. The battery assembly of any one of examples 1-4, wherein: the battery is configured to, during a faulty operation of the battery, vent outgases from or near the positive terminal of the battery, such that the outgases are vented out of the battery assembly through the opening of the array of openings of the cold plate.

Example 6. The battery assembly of any one of examples 1-5, wherein the cold plate comprises a first surface facing the battery, and a second surface opposite the first surface, and wherein the battery assembly further comprises: coolant tubes arranged on the second surface of the cold plate.

Example 7. The battery assembly of any one of examples 1-6, wherein the array of openings is a first array of openings, and wherein the battery assembly further comprises: a thermal pad between the conductive line and the cold plate, wherein the thermal pad has a second array of openings that is substantially aligned with the first array of openings of the cold plate.

Example 8. The battery assembly of any one of examples 1-7, further comprising: a structure including a slot, wherein the battery is within the slot; and a mounting hardware extending through an opening of the array of openings of the cold plate and extending within the structure.

Example 9. The battery assembly of any one of examples 1-8, wherein a thickness of the dielectric coating on an edge of the opening is at least 0.003 inch.

Example 10. A method comprising: forming a cold plate comprising conductive material and having a plurality of openings; coating the cold plate with dielectric coating; placing the cold plate proximal to a metal plate comprising one or more metals, and exposing the cold plate to moisture and/or water, wherein a minimum lateral distance between the cold plate and the metal plate is at most 0.5 inch; while the cold plate is exposed to the moisture and/or the water, applying a voltage across the cold plate and the metal plate, and measuring a resultant leakage current through the cold plate; and in response to the leakage current being higher than a threshold value, recoating the cold plate with the dielectric coating.

Example 11. The method of example 10, wherein exposing the cold plate to moisture and/or water comprises: submerging the cold plate and the metal plate in water.

Example 12. The method of example 10, wherein exposing the cold plate to moisture and/or water comprises: spraying water on the cold plate and/or operating a water humidifier proximate to the cold plate.

Example 13. The method of any one of examples 10-11, further comprising subsequent to recoating the cold plate with the dielectric coating: placing the recoated cold plate proximal to the metal plate and exposing the recoated cold plate to moisture and/or water; and while the recoated cold plate is exposed to the moisture and/or the water, reapplying a voltage across the recoated cold plate and the metal plate, and measuring a resultant leakage current through the recoated cold plate Example 14. The method of any one of examples 10-13, further comprising: in response to the leakage current being lower than the threshold value, determining that a cold plate forming process is complete.

Example 15. The method of example 14, wherein upon completion of the formation process, a thickness of the dielectric coating on an edge of an opening of the plurality of openings is at least 0.003 inch.

Example 16. The method of any one of examples 10-15, wherein a battery assembly in which the cold plate is to be used is rated to operate at a first voltage, and applying the voltage across the cold plate and the metal plate comprises: applying the voltage across the cold plate and the metal plate that is at least three time the first voltage rating of the battery assembly, to account for an altitude of at least 10,000 ft at which the battery assembly is rated to operate.

Example 17. The method of any one of examples 10-16, wherein applying the voltage comprises: applying the voltage across the cold plate and the metal plate for at least a threshold period of time.

Example 18. A system comprising: an aircraft; and a battery assembly installed within the aircraft, wherein the battery assembly comprises a cold plate comprising conductive material and coated with dielectric coating, the cold plate comprising a first array of openings therewithin, such that a thickness of the dielectric coating on an edge of an opening of the plurality of openings is at least 0.003 inch, a battery having a terminal that is adjacent to and substantially aligned with the opening of the first array of openings, a conductive line coupled to the terminal of the battery, and a thermal pad between the conductive line and the cold plate, wherein the thermal pad has a second array of openings that is substantially aligned with the first array of openings of the cold plate.

Example 19. The system of example 18, wherein the battery assembly is installed within a section of the aircraft, wherein air pressure within the section of the aircraft is not regulated when the aircraft is flying at an altitude.

Example 20. The system of any one of examples 18-19, wherein a distance between the conductive line and an edge of the opening is at most 0.4 inch.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future-filed applications claiming priority to this application may claim the disclosed subject matter in a different manner and generally may include any set of one or more limitations as variously disclosed or otherwise demonstrated herein.

What is claimed is:

1. A battery assembly comprising:

a first cold plate comprising a conductive material and coated with a dielectric coating, the cold plate comprising a first array of openings therewithin;

a first battery adjacent to the first cold plate; and a conductive line coupled to a first positive terminal of the first battery, wherein the first positive terminal of the first battery is adjacent to and substantially aligned with a first opening of the first array of openings;

wherein a distance between (i) an edge of an opening in the first array of openings and (ii) one or both the conductive line and the first battery is at most 0.4 inch;

a second cold plate that is substantially parallel to the first cold plate, the second cold plate comprising a conductive material and coated with a dielectric coating, the second cold plate comprising a second array of openings therewithin;

a second battery having a second positive terminal that is adjacent to and substantially aligned with a second opening of the second array of openings;

a first negative terminal of the first battery faces the second cold plate and is not aligned to any opening of the second array of openings; and a second negative terminal of the second battery faces the first cold plate and is not aligned to any opening of the first array of openings.

2. The battery assembly of claim 1, further comprising:

a structure comprising aluminum, wherein the structure includes at least a first slot and a second slot, and wherein the first battery is within the first slot and the second battery is within the second slot.

3. The battery assembly of claim 1, wherein:

the first battery is configured to, during a faulty operation of the first battery, vent outgases from or near the first positive terminal of the first battery, such that the outgases are vented out of the battery assembly through the first opening of the first array of openings of the first cold plate.

4. The battery assembly of claim 1, wherein the first cold plate comprises a first surface facing the first battery, and a second surface opposite the first surface, and wherein the battery assembly further comprises:

coolant tubes arranged on the second surface of the first cold plate.

5. The battery assembly of claim 1, wherein the battery assembly further comprises:

a thermal pad between the conductive line and the first cold plate, wherein the second array of openings is substantially aligned with the first array of openings of the first cold plate.

6. The battery assembly of claim 1, further comprising:

a structure including a slot, wherein the first battery is within the slot; and a mounting hardware extending through an opening of the first array of openings of the first cold plate and extending within the structure.

7. The battery assembly of claim 1, wherein a thickness of the dielectric coating on an edge of the first opening of the first cold plate is at least 0.003 inch.

8. A system comprising:

an aircraft; and a battery assembly installed within the aircraft, wherein the battery assembly comprises a first cold plate comprising conductive material and coated with a dielectric coating, the first cold plate comprising a first array of openings therewithin, such that a thickness of the dielectric coating on an edge of an opening of the plurality of openings is at least 0.003 inch, a first battery having a first terminal that is adjacent to and substantially aligned with the opening of the first array of openings, a conductive line coupled to the first terminal of the first battery, and a thermal pad between the conductive line and the first cold plate, wherein the thermal pad has a second array of openings that is substantially aligned with the first array of openings of the first cold plate;

a second cold plate that is substantially parallel to the first cold plate, the second cold plate comprising a conductive material and coated with a dielectric coating, the second cold plate comprising a second array of openings therewithin;

a second battery having a second terminal that is adjacent to and substantially aligned with the second array of openings;

an additional terminal of the first battery facing the second cold plate and is not aligned to any opening of the second array of openings; and an additional terminal of the second battery facing the first cold plate and is not aligned to any opening of the first array of openings.

9. The system of claim 8, wherein the battery assembly is installed within a section of the aircraft, wherein air pressure within the section of the aircraft is not regulated when the aircraft is flying at an altitude above a testing altitude.

10. The system of claim 8, wherein a distance between the conductive line and an edge of the opening of the first cold plate is at most 0.4 inch.

* * * * *